US011589102B2

(12) United States Patent
Yang et al.

(10) Patent No.: US 11,589,102 B2
(45) Date of Patent: Feb. 21, 2023

(54) SCREEN PROJECTION METHOD AND SYSTEM

(71) Applicant: Shanghai Hode Information Technology Co., Ltd., Shanghai (CN)

(72) Inventors: Zhihui Yang, Shanghai (CN); Hao Wang, Shanghai (CN); Yaoqi Zhang, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 139 days.

(21) Appl. No.: 17/308,600

(22) Filed: May 5, 2021

(65) Prior Publication Data
US 2021/0349382 A1 Nov. 11, 2021

(30) Foreign Application Priority Data
May 6, 2020 (CN) .......................... 202010371574.5

(51) Int. Cl.
| H04N 21/41 | (2011.01) |
| G03B 21/56 | (2006.01) |
| H04N 9/31 | (2006.01) |
| H04N 21/436 | (2011.01) |
| H04N 21/442 | (2011.01) |

(52) U.S. Cl.
CPC ......... H04N 21/4122 (2013.01); G03B 21/56 (2013.01); H04N 9/31 (2013.01); H04N 21/436 (2013.01); H04N 21/4424 (2013.01)

(58) Field of Classification Search
CPC ............... H04N 7/106; H04N 21/4781; H04N 21/6125; H04N 21/6587; H04N 21/2343; H04N 19/61; H04N 19/107
See application file for complete search history.

(56) References Cited

U.S. PATENT DOCUMENTS

| 11,271,940 B1* | 3/2022 | Belli ................... H04L 63/0876 |
| 2014/0222477 A1* | 8/2014 | Kenkre ............ G06Q 10/06313 |
| | | 705/7.12 |
| 2021/0344991 A1* | 11/2021 | Todd ................... H04N 21/4622 |

FOREIGN PATENT DOCUMENTS

| CN | 1685370 A | 10/2005 |
| CN | 102447693 A | 5/2012 |
| CN | 103685812 A | 3/2014 |

(Continued)

*Primary Examiner* — Samira Monshi
(74) *Attorney, Agent, or Firm* — BakerHostetler

(57) ABSTRACT

The embodiment of the present application provides screen projection techniques applied in a computer device, and the techniques comprise obtaining first information indicative of a capability of the computer device; obtaining second information indicative of a capability of a target terminal, wherein the target terminal is configured as a projection object of the computer device; determining a performer of performing rendering operations on multimedia content based on the first information and the second information; performing the rendering operations on the multimedia content by the computer device and sending rendered multimedia content to the target terminal when the computer device is the performer. The screen projection techniques described in the embodiment may dynamically determine a performer of performing special effect rendering operations based on the capability of the computer devices and the capability of the target terminal.

20 Claims, 15 Drawing Sheets

(56) References Cited

FOREIGN PATENT DOCUMENTS

| CN | 106209523 A | 12/2016 |
|---|---|---|
| CN | 108052395 A | 5/2018 |
| CN | 109361945 A | 2/2019 |

* cited by examiner

SCREEN PROJECTION METHOD AND SYSTEM

CROSS-REFERENCE TO RELATED APPLICATION

The present application claims priority of Chinese Patent Application Number CN202010371574.5, file on May 6, 2020, entitled "Screen Projection Method and System". The entire content of the above-identified Chinese patent application is incorporated in the present application by reference.

BACKGROUND

With the rise of the Internet of Things and smart devices, smart devices can communicate through the Internet of Things, and one of the smart devices in the communication connection can perform a control operation on another smart device.

SUMMARY

The purpose of the embodiments of the present application is to provide a screen projection method, system, computer device, and computer-readable storage medium, which are used to solve the technical problem of poor playing effect and poor user's viewing experience caused by poor special effect rendering in traditional screen projection operations. The so-called screen projection operation refers to the delivery of multimedia content of a smart device A to a smart device B, so that the smart device B can also synchronously play the multimedia content of the smart device A.

On one aspect of the embodiments of the present application, a screen projection method applied in a computer device is provided, and the method includes: obtaining first capability information of the computer device; obtaining second capability information of a target terminal, wherein the target terminal is configured as a screen projection object of the computer device; determining a rendering operation performer of multimedia content in the computer device according to the first capability information and the second capability information; if the computer device is the rendering operation performer, performing a rendering operation on the multimedia content; and sending the rendered multimedia content to the target terminal.

On another aspect of the embodiments of the present application, a screen projection system is provided, and the screen projection system includes a first obtaining module, obtaining first capability information of the computer device; a second obtaining module, obtaining second capability information of a target terminal, wherein the target terminal is configured as a screen projection object of the computer device; a determining module, determining a rendering operation performer of multimedia content in the computer device according to the first capability information and the second capability information; a special effect rendering module, if the computer device is the rendering operation performer, performing a rendering operation on the multimedia content; and a sending module, sending the rendered multimedia content to the target terminal.

On another aspect of the embodiments of the present application, a computer device is provided, which includes a memory, a processor, and computer-readable programs that stored in the memory and operable on the processor, wherein the computer-readable programs are executed by the processor to implement the steps of the screen projection method described above.

On another aspect of the embodiments of the present application, a computer-readable storage medium is provided, which stores computer-readable programs that upon execution by at least one processor cause the at least one processor to implement the steps of the screen projection method described above.

A screen projection method, system, computer device, and computer-readable storage medium are provided in the embodiments of the present application. The screen projection method described in the present embodiment can dynamically determine a rendering operation performer of multimedia content according to the capabilities of the computer device (which is a screen projection performer) and the target terminal (which is a screen projection object), avoiding the problem of poor special effect rendering due to the insufficient special effect rendering capability or a fixed rendering operation performer in traditional screen projection operations, and effectively improving the special effect rendering effect, thereby effectively improving the playing effect and viewing experience of the multimedia content.

BRIEF DESCRIPTION OF THE DRAWINGS

FIG. 11 schematically shows an operation flowchart of a screen projection method in a specific scenario according to a first embodiment of the present application;

DETAILED DESCRIPTION OF ILLUSTRATIVE EMBODIMENTS

In order to make the purpose, technical solutions, and advantages of the present application clearer, the following further describes the present application in detail with reference to the accompanying drawings and embodiments. It should be understood that the specific embodiments described here are only used to explain the present application, and not used to limit the present application. Based on the embodiments in the present application, all other embodiments obtained by those of ordinary skills in the art without creative work are falling within the protection scope of the present application.

It should be noted that the descriptions related to "first", "second" and so on in the embodiments of the present application are only for descriptive purposes, and cannot be understood as indicating or implying their relative importance or implicitly specifying the indicated technical features quantity. Therefore, the features defined with "first" and "second" may explicitly or implicitly include at least one of the features. In addition, the technical solutions between the various embodiments can be combined with each other, but they must be based on what can be achieved by those of ordinary skill in the art. When the combination of technical solutions is contradictory or cannot be achieved, it should be considered that such a combination of technical solutions does not exist, and is not within the scope of protection required by the present application.

Figure 1:
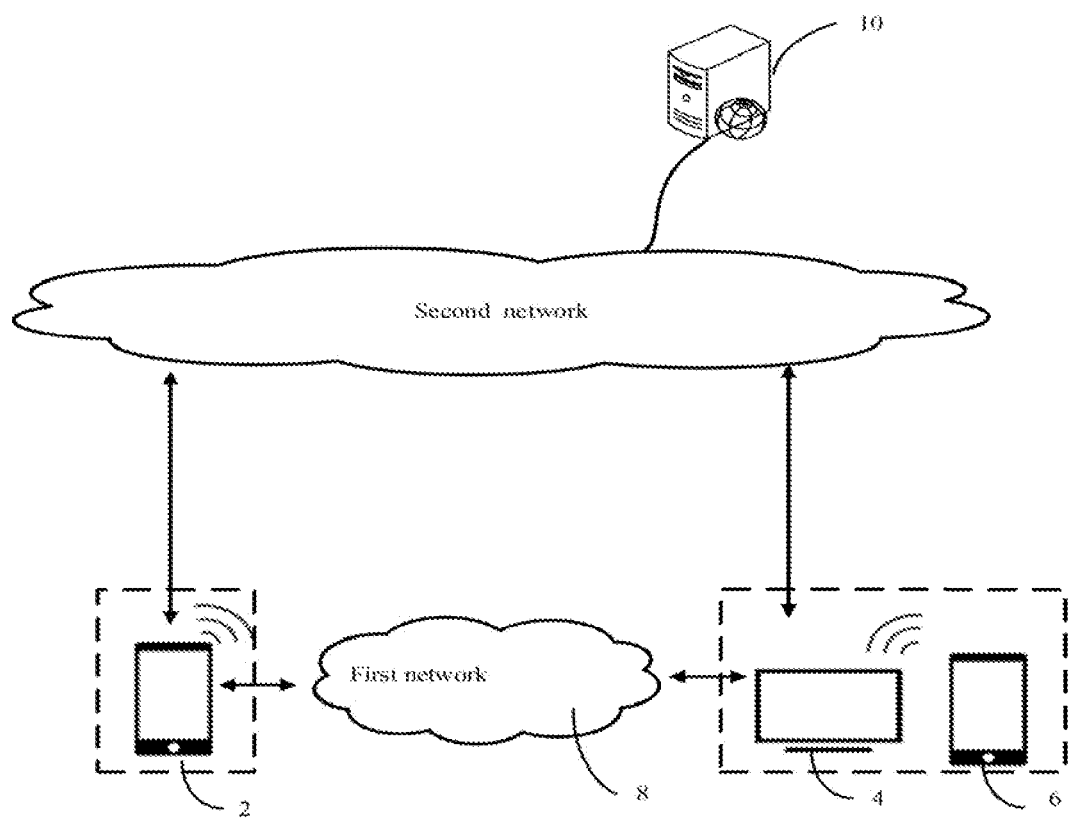
FIG. 1 schematically shows a network architecture diagram of a screen projection system of a screen projection method according to an embodiment of the present application.

FIG. 1 schematically shows a network architecture diagram of a screen projection system of a screen projection method according to an embodiment of the present application. The network architecture diagram of the projection system includes a computer device 2, a target terminal 4, other terminals 6, a router 8, and a server 10. Wherein:

The computer device 2 can be used as a sending side in the network architecture of the screen projection system, used to project multimedia content to other devices and send various instructions to other devices. In an exemplary embodiment, the computer device 2 includes, but is not limited to, a smartphone, a tablet computer, a game console, a laptop computer, and so on.

The target terminal 4 and other terminals 6 can be used as a display side in the network architecture of the screen projection system to receive the multimedia content and various instructions of the computer device 2, and simultaneously play the received multimedia content to a display panel of the own device or the display panel of an associated device. The target terminal 4 can be related devices with a larger screen such as virtual reality devices, set-top boxes, smart TVs, vehicle terminals, large open-air display panels, and so on, of course, can also be smartphones, tablet computers, laptop computers, and other related devices with a smaller screen.

The router 8 can be used as a gateway in the network architecture of the screen projection system to form a local area network and provide Internet services. The router 8 can provide a local connection among the computer device 2, the target terminal 4, and other terminals 6.

The server 10 can be used as a cloud device in the network architecture of the screen projection system to provide cloud services, such as cloud account management services. The server 10 may be a rack server, a blade server, a tower server, or a cabinet server (which includes an independent server, or a server cluster composed of multiple servers), and so on.

The computer device 2 can discover the target terminal 4 through a first network or a second network, and establish a network connection with the target terminal 4 based on the first network or the second network. Through the established network connection, the computer device 2 can put multimedia content to be projected on a screen into the target terminal 4 and play the multimedia content through the target terminal 4. The first network may be the local area network, and the local area network may be a wired local area network or a wireless local area network. As shown in FIG. 1, the wireless local area network may be a Wi-Fi network formed by the router 8. The second network may be a wide area network, such as the Internet. The wide area network may include physical links, such as coaxial cable links, twisted pair cable links, optical fiber links, combinations thereof, and so on. The wide area network may also include wireless links, such as cellular links, satellite links, and so on.

Figure 2:
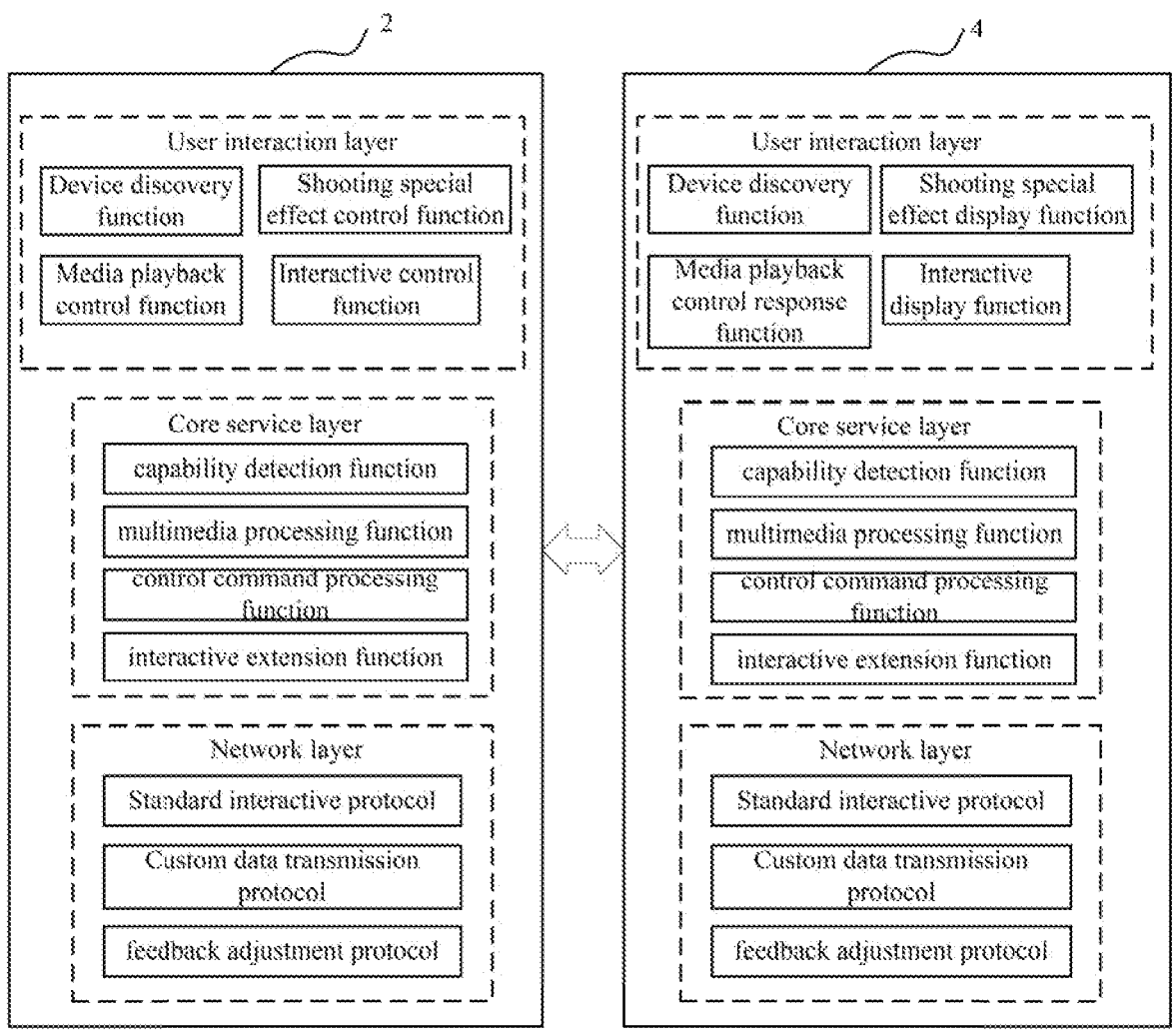
FIG. 2 schematically shows a functional diagram of a screen projection system according to an embodiment of the present application.

In an exemplary embodiment, as shown in FIG. 2, the computer device 2 may have multiple functions, such as: a device discovery function, a shooting special effect control function, a media playback control function and an interactive control function at a user interaction layer, a capability detection function, a multimedia processing function, a control command processing function and an interactive extension function at a core service layer and so on, as well as a standard interactive protocol, a custom data transmission protocol and a feedback adjustment protocol in a network layer, and so on. Correspondingly, the target terminal 4 may also have multiple functions, such as the device discovery function, a shooting special effect display function, a media playback response function and an interactive display function at the user interaction layer, the capability detection function, the multimedia processing function, the control command processing function, the interactive extension function at the core service layer and so on, as well as the standard interactive protocol, the custom data transmission protocol and the feedback adjustment protocol at the network layer, and so on.

In the computer device 2, the device discovery function is to actively or passively discover a screen projection object (such as the target terminal 4); the shooting special effect control function is to provide audio or video special effect rendering services. An audio special effect can include audio reverberation, speed change, tone change, restriction, echo, compression, gain control, equalization control, and so on. A video special effect can include beauty, makeup, face recognition, two-dimensional stickers, three-dimensional stickers, and so on. The media playback control function is to control the playing of the multimedia content; the interactive control function is to send interactive information, such as virtual cars, texts, pictures, and so on; the capability detection function is to collect first capability information of the computer device 2 itself and to obtain second capability information of the screen projection object (such as the target terminal 4); the multimedia processing function is to collect and code multimedia; the control command processing function is to send and receive interactive data and commands; the interactive extension function is to send an interactive content to the screen projection object (such as the target terminal 4) so that the interactive content can be displayed on the screen projection object; the standard interactive protocol, the custom data transmission protocol, and the feedback adjustment protocol, etc. are used for data transmission at the network layer.

In the target terminal 4, the device discovery function is to enable the target terminal 4 to be discovered by the computer device 2; the shooting special effect display function can provide audio or video special effect rendering services and play the multimedia content after special effect rendering. The audio special effect can include audio reverberation, speed change, tone change, restriction, echo, compression, gain control, equalization control, and so on. The video special effect can include beauty, makeup, face recognition, two-dimensional stickers, three-dimensional stickers, and so on. The media playback response function is to respond to multimedia playback control instructions sent by the computer device 2; the interactive display function is to display interactive information, such as virtual cars, text, pictures, and so on; the capability detection function is to collect the second capability information of the target terminal 4 itself, and provide the second capability information to the computer device 2. The multimedia processing function is to decode the multimedia content; the control command processing function is to send and receive interactive data and commands; the interactive extension function is to receive the interactive content sent by the computer device 2 and display the interactive content on the display screen; the standard interactive protocol, the custom data transmission protocol, and the feedback adjustment protocol, etc. are used for data transmission at the network layer.

The above briefly introduces the functions of the computer device 2 and the target terminal 4.

The computer device 2 can perform screen projection operations to the target terminal 4.

However, some of the screen projection operations involve special effect rendering to increase user stickiness. The existing screen projection operation is to fix the computer device 2 or the target terminal 4 as a rendering operation performer of the special effect rendering. Although the computer device 2 and the target terminal 4 may have relatively complete functions, due to constraints of hardware, software, and so on, the processing capability (such as special effect rendering capability) of the computer device 2 or the target terminal 4 may be poor. If the computer device 2 or the target terminal 4 that is the rendering operation performer of the special effect rendering has insufficient processing capability, the insufficient processing capability will often lead to poor special effect rendering after special effect rendering of the multimedia content, thereby resulting in: the multimedia content provided by computer device 2 cannot be played well on the target terminal 4, thus affecting user's viewing experience. Taking the computer device 2 as an example, in the case that the special effect rendering capability of the computer device 2 is very poor, if the computer device 2 is fixed as the rendering operation performer to perform the special effect rendering operation on the multimedia content to be projected on the screen, the special effect rendering of the multimedia content may not reach an expected rendering effect. If the computer device 2 sends the multimedia content that does not achieve the expected rendering effect to the target terminal 4 for playing, a playing effect of the multimedia content that does not achieve the expected rendering effect in the target terminal 4 is also difficult to achieve the expected playing effect, which reduces user's viewing experience.

The purpose of the present application is to use the capability detection function to decide the rendering operation performer of the multimedia content. In other words, the purpose of the present application is to dynamically adjust the target host that performs special effect rendering on the multimedia content. In this way, it is possible to prevent a certain fixed rendering operation performer from affecting the special effect rendering of the multimedia content due to insufficient processing capability of the special effect rendering, thereby affecting the final playing effect of the multimedia content and reducing the user's viewing experience.

A First Embodiment

Figure 3:
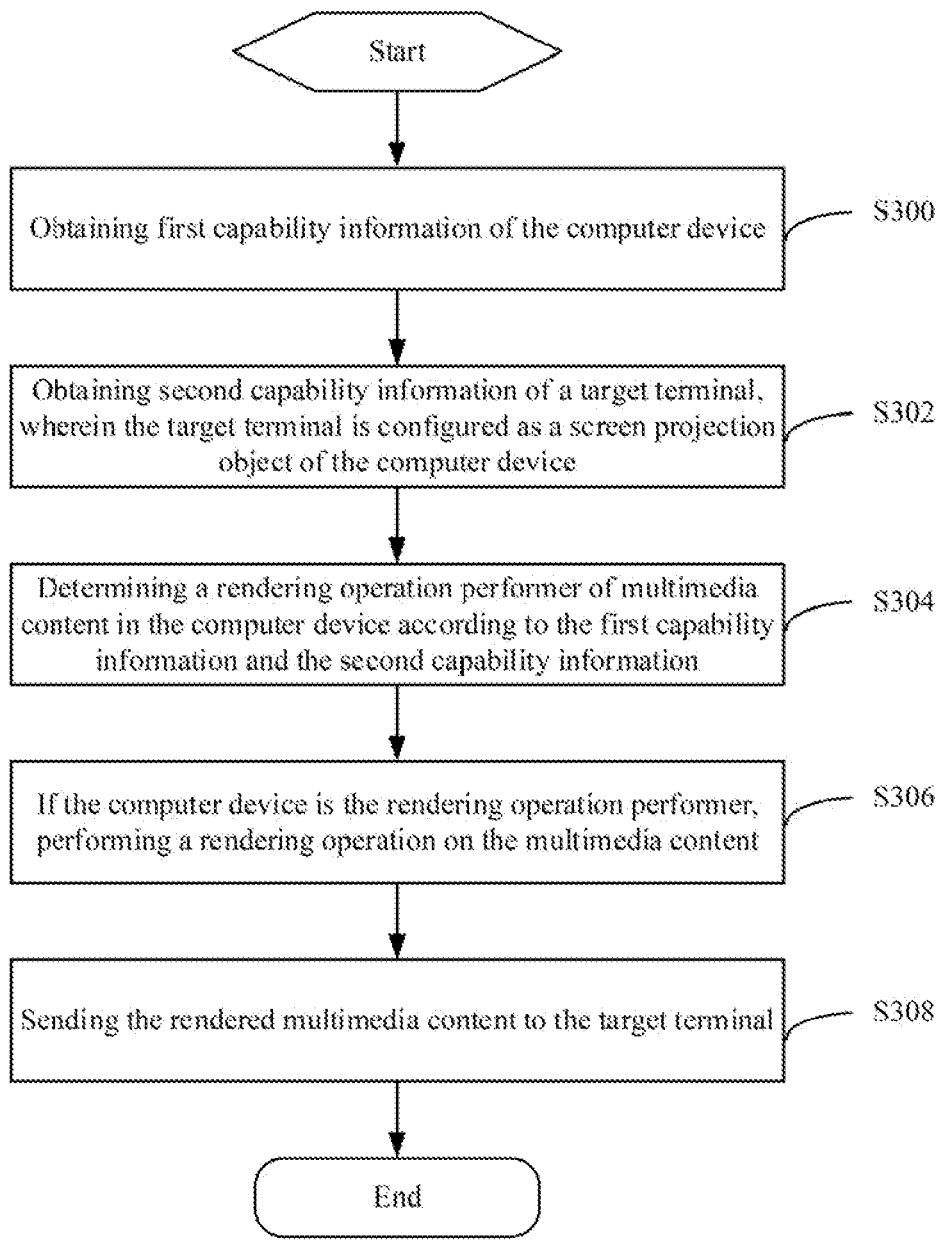
FIG. 3 schematically shows a flowchart of a screen projection method according to a first embodiment of the present application.

FIG. 3 schematically shows a flowchart of a screen projection method according to a first embodiment of the present application. It can be understood that the flowchart in the method embodiment is not used to limit the order of execution of the steps. The following exemplarily describes the computer device 2 as the execution subject.

As shown in FIG. 3, the screen projection method includes steps S300 to S308, wherein:

Step S300, obtaining the first capability information of the computer device.

In an exemplary embodiment, the first capability information includes N first sub-capability information, and the N first sub-capability information include: first device model information, first Central Processing Unit (CPU) capability information, first (Graphics Processing Unit) GPU capability information, first storage capability information, first sound card capability information, first graphics card capability information, first operating system information, first graphics rendering interface information, and/or first codec capability information. N is a positive integer and not less than 1, Wherein:

The first device model information includes manufacturer and model of the computer device 2 and so on.

The first CPU (central processing unit) capability information includes manufacturer, model, and performance of the CPU in the computer device 2 and so on.

The first GPU (graphics processing unit) capability information includes manufacturer, model, and performance of the GPU in the computer device 2 and so on.

The first storage capability information includes a size of volatile memory and/or a size of non-volatile memory in the computer device 2, wherein the volatile memory or the non-volatile memory can be used to store special effect data.

The first sound card capability information includes manufacturer, model, and performance of the sound card in the computer device 2 and so on.

The first graphics card capability information includes manufacturer, model, and performance of the graphics card in the computer device 2 and so on.

The first operating system information includes system type and system version in the computer device 2, such as Android Q.

The first graphics rendering interface information includes graphics rendering interface type of the graphics rendering interface in the computer device 2, such as OpenGL or DirectX, and a version number of the graphics rendering interface, such as OpenGL 2.0 or OpenGL 3.0.

The first codec capability information includes codec systems (such as H264/H265) in the computer device 2 and whether supporting hardware codec.

Step S302, obtaining second capability information of the target terminal, wherein the target terminal is configured as the screen projection object of the computer device.

In the exemplary embodiment, the second capability information comprises N second sub-capability information, and the N second sub-capability information comprises second device model information, second CPU capability information, second GPU capability information, second storage capability information, second sound card capability information, second graphics card capability information, second operating system information, second graphics rendering interface information, and/or a second codec capability information. N is a positive integer and not less than 1, Wherein:

The second device model information includes manufacturer and model of the target terminal 4 and so on.

The second CPU capability information includes manufacturer, model, and performance of the CPU in the target terminal 4 and so on.

The second GPU capability information includes manufacturer, model, and performance of the GPU in the target terminal 4 and so on.

The second storage capability information includes a size of volatile memory and/or a size of non-volatile memory in the target terminal 4, wherein the volatile memory or the non-volatile memory can be used to store special effect data.

The second sound card capability information includes manufacturer, model, and performance of the sound card in the target terminal 4 and so on.

The second graphics card capability information includes manufacturer, model, and performance of the graphics card in the target terminal 4 and so on.

The second operating system information includes system type and system version in the target terminal 4, such as Android 6.0.

The second graphics rendering interface information includes a graphics rendering interface type of the graphics rendering interface and a version number of the graphics rendering interface in the target terminal 4.

The second codec capability information includes codec systems (such as H264/H265) in the in the target terminal 4 and whether supporting hardware codec.

Figure 4:
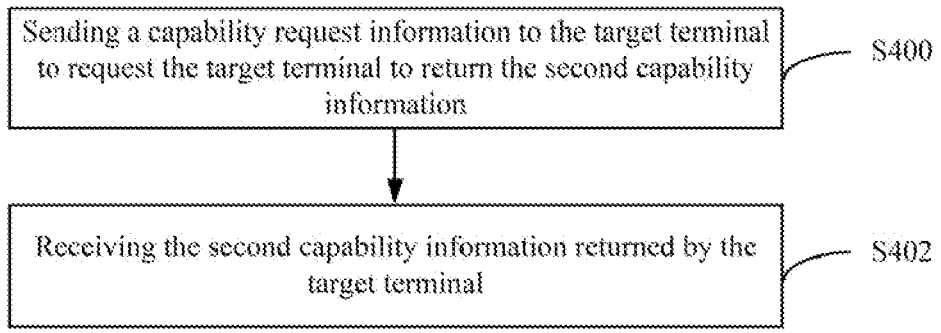
FIG. 4 schematically shows a sub-step of step S302 in FIG. 2.

In the exemplary embodiment, as shown in FIG. 4, the step S304 may include steps S400 to S402, wherein: step S400, sending a capability request information to the target terminal to request the target terminal to return the second capability information; step S402, receiving the second capability information returned by the target terminal. Of course, under a pre-agreed rule, if a connection is successfully established between the computer device 2 and the target terminal 4, the target terminal 4 may also actively collect the second capability information and actively provide the second capability information to the computer device 2.

Step S304, determining the rendering operation performer of the multimedia content in the computer device 2 according to the first capability information and the second capability information.

Based on capability detection function of the computer device 2, following situations may be obtained:

The first situation: both the first capability information and the second capability information are successfully obtained;

The second situation: both the first capability information and the second capability information are unsuccessfully obtained;

The third situation: the first capability information is successfully obtained and the second capability information is unsuccessfully obtained, and the second capability information may be expressed to be Null;

The fourth situation: the first capability information is unsuccessfully obtained and the second capability information is successfully obtained, and the first capability information may be expressed to be Null.

For the first situation, the computer device 2 may compare processing capability of the computer device 2 with the processing capability of the target terminal 4 according to the first capability information and the second capability information, and determine the rendering operation performer according to a comparison result. For example, if the processing capability of the computer device 2 is greater than the processing capability of the target terminal 4, then the computer device 2 is determined to be the rendering operation performer; if the processing capability of the computer device 2 is less than the processing capability of the target terminal 4, then the target terminal 4 is determined to be the rendering operation performer.

For the second situation, the computer device 2 may determine the rendering operation performer through a predetermined default rule. For example, if the computer device 2 is the rendering operation performer under the default rule, then the computer device 2 is determined to be the rendering operation performer, if the target terminal 4 is the rendering operation performer under the default rule, then the target terminal 4 is determined to be the rendering operation performer.

For the third situation, the computer device 2 may determine the rendering operation performer according to the default rule. The computer device 2 may also determine whether the computer device 2 is capable of performing the rendering operation on the multimedia content according to the first capability information. If the computer device 2 is capable of performing the rendering operation on the multimedia content, the computer device 2 is determined to be the rendering operation performer. If the computer device 2 is not capable of performing the rendering operation on the multimedia content, the rendering operation performer is determined by the default rule.

For the fourth situation, the computer device 2 may determine the rendering operation performer according to the default rule. The computer device 2 may also determine whether the target terminal 4 is capable of performing the rendering operation on the multimedia content according to the second capability information. If the target terminal 4 is capable of performing the rendering operation on the multimedia content, the target terminal 4 is determined to be the rendering operation performer. If the target terminal 4 is not capable of performing the rendering operation on the multimedia content, the rendering operation performer is determined by the default rule.

Figure 5:
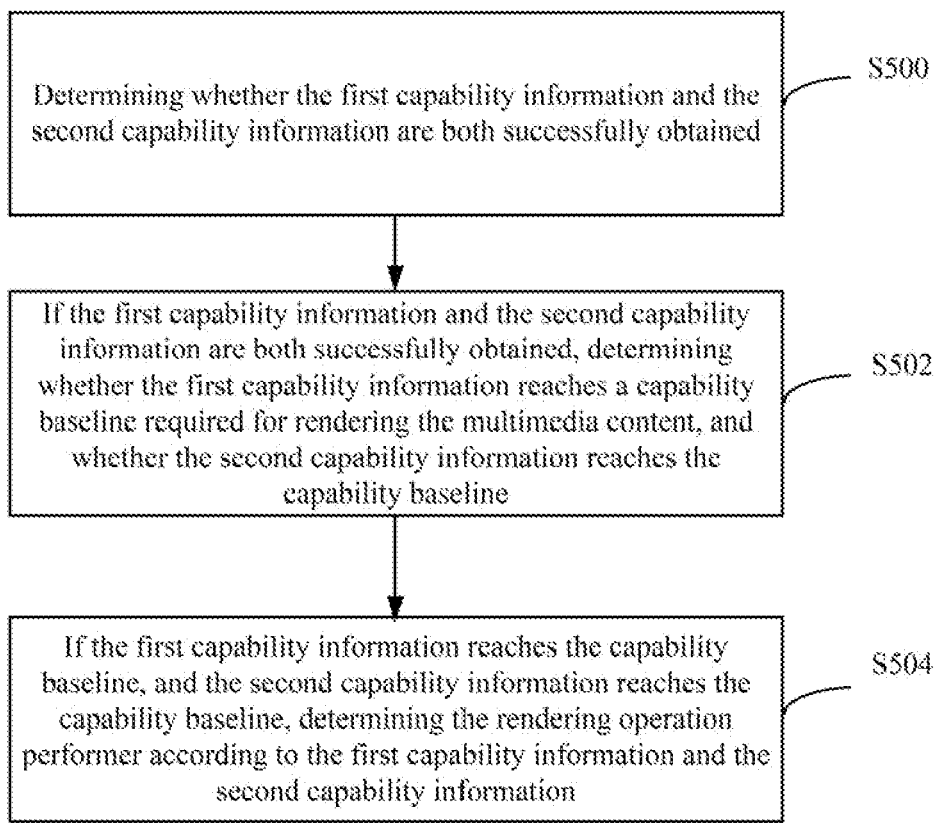
FIG. 5 schematically shows a sub-step of step S304 in FIG. 2.

In the exemplary embodiment, as shown in FIG. 5, the step S304 may include steps S500 to S504, wherein: step S500, determining whether the first capability information and the second capability information are both successfully obtained; step S502, if the first capability information and the second capability information are both successfully obtained, determining whether the first capability information reaches a capability baseline required for rendering the multimedia content, and whether the second capability information reaches the capability baseline; step S504, if the first capability information reaches the capability baseline, and the second capability information reaches the capability baseline, determining the rendering operation performer according to the first capability information and the second capability information.

Figure 6:
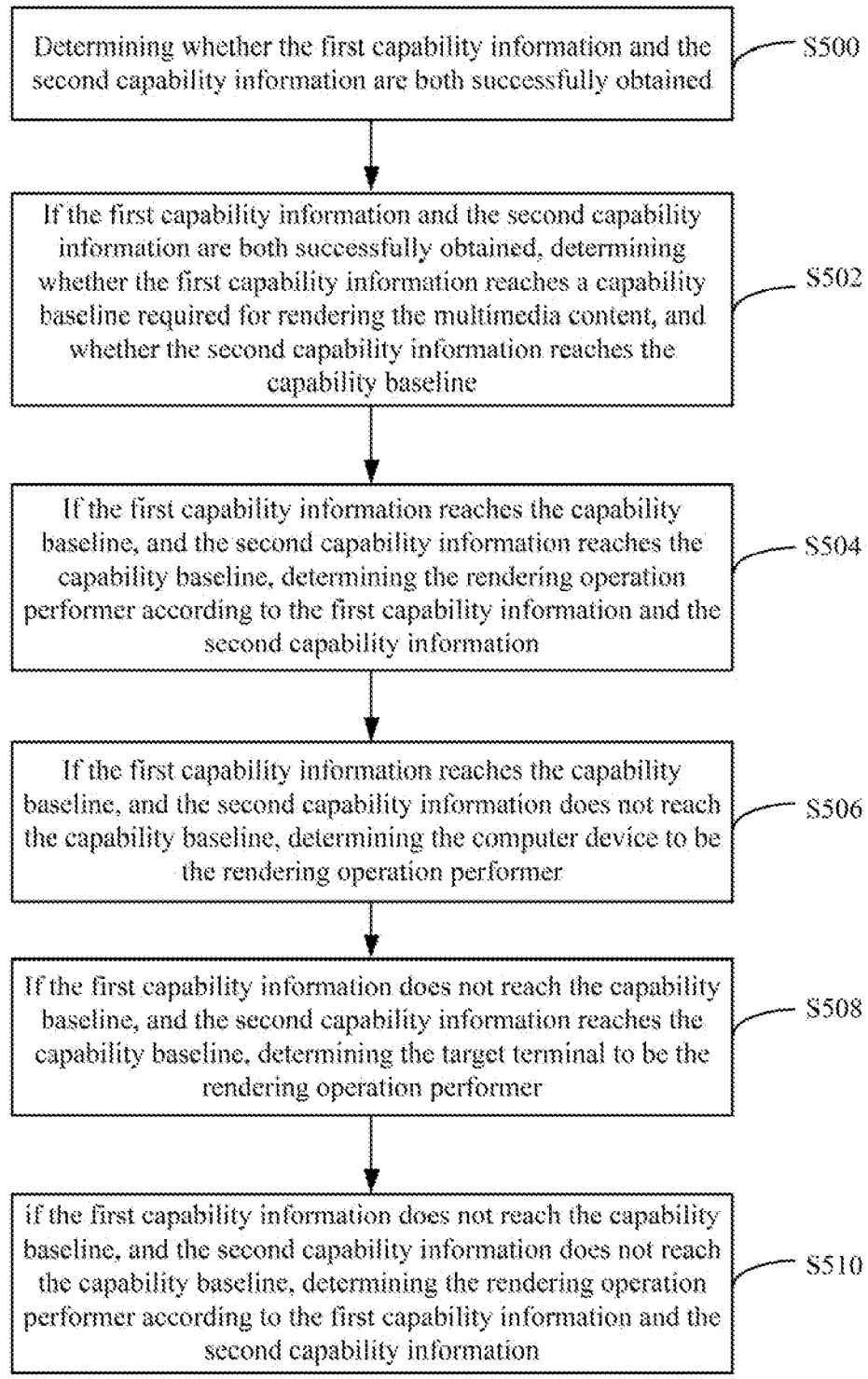
FIG. 6 schematically shows another sub-step of step S304 in FIG. 2.

In the exemplary embodiment, as shown in FIG. 6, the step S304 may include steps S506 to S510, wherein: step S506, if the first capability information reaches the capability baseline, and the second capability information does not reach the capability baseline, determining the computer device to be the rendering operation performer; step S508, if the first capability information does not reach the capability baseline, and the second capability information reaches the capability baseline, determining the target terminal to be the rendering operation performer; step S510, if the first capability information does not reach the capability baseline, and the second capability information does not reach the capability baseline, determining the rendering operation performer according to the first capability information and the second capability information.

Through steps S500 to S510, it is also possible to effectively select the rendering operation performer for rendering the multimedia content.

In the exemplary embodiment, the capability baseline is determined according to a rendering special effect corresponding to the multimedia content, wherein the rendering special effect includes audio an audio special effect, and/or a video special effect. The audio special effect can include audio reverberation, speed change, tone change, restriction, echo, compression, gain control, equalization control, and so on, and the video special effect can include beauty, makeup, face recognition, two-dimensional stickers, three-dimensional stickers and so on. Different rendering special effects have different requirements for software and hardware. Therefore, the capability baseline is dynamically changed according to different rendering special effects. For example, if the rendering special effect corresponding to the multimedia content is a face sticker special effect, the capability baseline corresponding to the face sticker special effect includes 200M storage space, 500M memory, Android version 9.0, and OpenGL 2.0. The above-mentioned capability baseline is the minimum requirement for rendering the face sticker special effect on the multimedia content. For example, if the operating system of the computer device 2 is the Android operating system, and the version of the Android operating system is 8.0, it means that the computer device 2 does not have the capability to perform face sticker special effect rendering on the multimedia content.

In the exemplary embodiment, that comparing the first capability information and the second capability information and determining the rendering operation performer according to the comparison result may be implemented in multiple implementation manners. Four implementation manners will be exemplarily provided below.

The first implementation manner: comparing comprehensive capabilities of the computer device 2 and the target terminal 4 according to the first capability information and the second capability information;

The second implementation manner: comparing an audio special effect processing capability of the computer device 2 with the audio special effect processing capability of the target terminal 4 according to the first capability information and the second capability information. This implementation manner is particularly suitable for the multimedia content including only audio;

The third implementation manner: comparing a video special effect processing capability of the computer device 2 with the video special effect processing capability of the target terminal 4 according to the first capability information and the second capability information. This implementation manner is particularly suitable for the multimedia content including only video;

Fourth implementation manner: according to an importance of sub-capacity in each of the N first sub-capability information and the N second sub-capacity information, a comparison is made in turn until it is determined whether the computer device 2 or the target terminal 4 is more suitable as the rendering operation performer.

Regarding the first implementation manner: in order to be able to reflect capability difference between the computer device 2 and the target terminal 4, thereby selecting a device with better capability as the rendering operation performer, comparing the first capability information with the second capability information and determining the rendering operation performer according to the comparison result can be implemented through steps S600 to S608. Wherein, step S600, comparing M first sub-capacity information and M second sub-capability information one by one to obtain M capability score $P_i$ corresponding to M first sub-capacity information and M capability score $Q_i$ corresponding to M second sub-capacity information; wherein, $P_i$ represents the capability score corresponding to the i-th first sub-capability information obtained by comparing the i-th first sub-capability information with the i-th second sub-capability information, and $Q_i$ represents the capability score corresponding to the i-th second sub-capability information obtained by comparing the i-th first sub-capability information with the i-th second sub-capability information, $1 \leq i \leq M$ and $1 \leq M \leq N$; step S602, obtaining a first comprehensive capability score $$\sum_{i=1}^{M} P_i * W_i$$

of the first capability information according to the M capability scores corresponding to the M first sub-capability information; step S604, obtaining a second comprehensive capability score $$\sum_{i=1}^{M} Q_i * W_i$$

of the second capability information according to the M capability scores corresponding to the M second sub-capability information; and step S606, comparing the first comprehensive capability score $$\sum_{i=1}^{M} P_i * W_i$$

and the second comprehensive capability score $$\sum_{i=1}^{M} Q_i * W_i,$$

and determining the rendering operation performer according to a comparison result; wherein, $W_i$ represents a weight value of the i-th first sub-capability information and the i-th second sub-capability information.

In the exemplary embodiment, Wi is a dynamic value, whose size is in a positive proportional relationship with a score difference between the capability score $P_i$ corresponding to the i-th first sub-capability information and the capability score $Q_i$ corresponding to the i-th second sub-capability information.

In the exemplary embodiment, in order to better reflect the capability difference between the computer device 2 and the target terminal 4, $W_i$ is the dynamic value, whose size is in the positive proportional relationship with the score difference between the capability sore $P_i$ corresponding to the i-th first sub-capability information and the capability score $Q_i$ corresponding to the i-th second sub-capability information. For example, the i-th first sub-capability information is the first CPU information, and the i-th second sub-capacity information is the second CPU information. If the score difference (such as 0) between the capability score of the first CPU capability information and the capability score of the second CPU information is small, the weight value $W_i$ corresponding to the first CPU capability information and the second CPU information will be relatively low, conversely, if the score difference between the capability score of the first CPU capability information and the capability score of the second CPU capability information is large, the weight value $W_i$ corresponding to the first CPU capability information and the second CPU capability information will be higher. A specific functional relationship corresponding to the positive proportional relationship can be set by the user. For example, the i-th first sub-capability information is the first storage capability information, and the i-th second sub-capability information is the second storage capability information. If the capability score of the first storage capability information and the capability score of the second storage capability information are large, and the OS system of the computer device 2 is learned to be not running smoothly according to the first storage capability information, the weight values corresponding to the first storage capability information and the second storage capability information will be relatively high, and the weight values of other capabilities will be relatively low.

In the exemplary embodiment, $W_i$ may also be a preset value. For example, if the purpose of the decision is to determine the rendering operation performer of the video special effect, the GPU, the graphics rendering interface type, and the graphics rendering interface version number can be set to a relatively high weight value.

For the second implementation manner: multiple first capability information associated with the audio special effect are selected from N first capability information, and multiple second capability information associated with the audio special effect can be selected from N second ability information. With reference to the specific implementation steps of the first implementation manner, the rendering operation performer is determined according to the plurality of first capability information associated with the audio special effect and the plurality of second capability information associated with the audio special effect.

For the third implementation manner: multiple first capability information associated with the video special effect are selected from N first capability information, and multiple second capability information associated with the video special effect can be selected from N second ability information. With reference to the specific implementation steps of the first implementation manner, the rendering operation performer is determined according to the plurality of first capability information associated with the video special effect and the plurality of second capability information associated with the video special effect.

Figure 7:
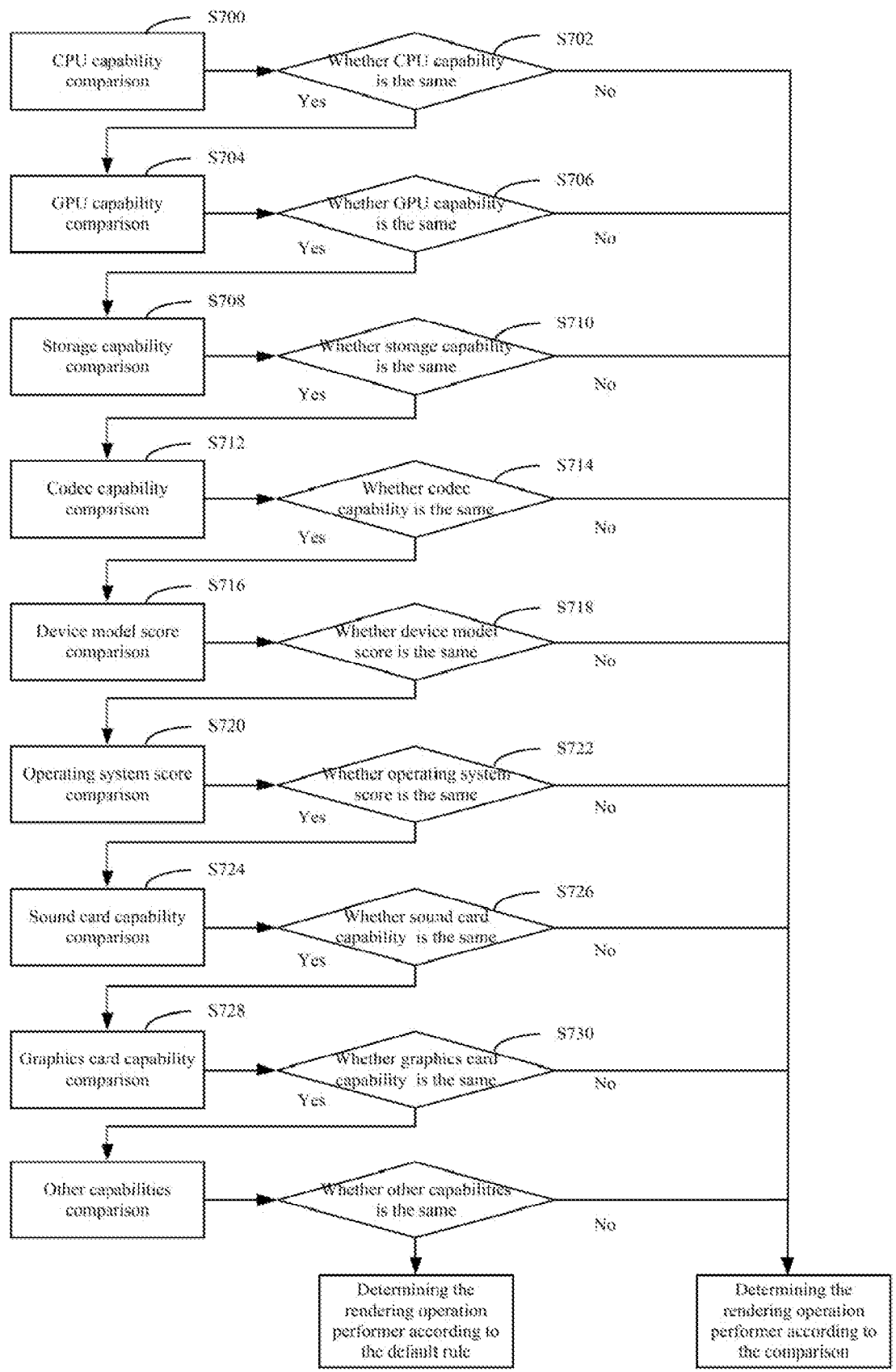
FIG. 7 schematically shows another sub-step of step S304 in FIG. 2.

For the fourth implementation manner: in order to be able to quickly reflect the capability difference between the computer device 2 and the target terminal 4, so as to quickly select the device with better capability as the rendering operation performer with less computation, as shown in FIG. 7, in order to more effectively select the device with better capability and more suitable for special effect rendering, comparing the first capability information with the second capability information and determining the rendering operation performer according to the comparison result may include the following step:

Step 700, comparing a first CPU capability of the computer device with a second CPU capability of the target terminal according to the first CPU capability information and the second CPU capability information.

Step 702, if the first CPU capability and the second CPU capability are different, determining the rendering operation performer according to the comparison result between the first CPU capability and the second CPU capability.

The computer device 2 can compare whether the CPU capability of the computer device 2 is better than the CPU capability of the target terminal 4 according to the manufacturer, model, performance, etc. of the CPU in computer device 2 and the manufacturer, model, performance, etc. of the CPU in target terminal 4.

As an example, if the CPU in computer device 2 is Qualcomm's Snapdragon 855 model, and the CPU in target terminal 4 is Qualcomm's Snapdragon 660 model, it means that the CPU capability of computer device 2 is better than that of target terminal 4, therefore, it can be determined that the computer device 2 is the rendering operation performer.

As the example, if the CPU in the computer device 2 is Qualcomm's Snapdragon 855 model, and the CPU in the target terminal 4 is also Qualcomm's Snapdragon 855 model, it means that the CPU in the computer device 2 and the CPU in the target terminal 4 are the same. Therefore, it is impossible to distinguish the pros and cons of the computer device 2 and the target terminal 2 through the CPU capability. At this time, the computer device 2 needs to further rely on other capability information for comparison, such as device model information. GPU capability information, and so on.

Exemplarily, when the CPU capability of the computer device 2 and the CPU capability of the target terminal 4 are the same, the device model information may be relied on to evaluate whether the CPU capability of the computer device 2 is better than the CPU capability of the target terminal 4. If the computer device 2 is a product of Xiaomi Company, and the target terminal 4 is the product of Huawei Company, the computer device 2 can jointly evaluate the CPU capability of the computer device 2 and the CPU capability of the target terminal 4 according to preset rules or running test programs, and whether the CPU capability of the computer device 2 is better than the CPU capability of the target terminal 4 is determined according to an evaluation result.

Exemplarily, in the case where the CPU capability of the computer device 2 and the CPU capability of the target terminal 4 are the same, the computer device 2 may further rely on GPU capability comparison to determine the rendering operation performer. Details are as follows:

In the exemplary embodiment, comparing the first capability information with the second capability information and determining the rendering operation performer according to the comparison result, further includes:

Step 704, if the first CPU capability and the second CPU capability are the same, comparing a first GPU capability of the computer device with a second GPU capability of the target terminal according to the first GPU capability information and the second GPU capability information.

Step 706, if the first GPU capability and the second GPU capability are different, determining the rendering operation performer according to the comparison result between the first GPU capability and the second GPU capability.

The computer device 2 can compare whether the GPU capability of the computer device 2 is better than the GPU capability of the target terminal 4 according to the manufacturer, model, performance, etc. of the CPU in computer device 2 and the manufacturer, model, performance, etc. of the GPI in target terminal 4.

As the example, if the GPU capability of the computer device 2 is better than the GPU capability of the target terminal 4, it can be determined that the computer device 2 is the rendering operation performer. The computer device 2 can jointly evaluate the GPU capability of the computer device 2 and the GPU capability of the target terminal 4 according to preset rules or running test programs, and whether the GPU capability of the computer device 2 is better than the GPU capability of the target terminal 4 is determined according to the evaluation result.

Exemplarily, in the case where the GPU capability of the computer device 2 and the GPU capability of the target terminal 4 are the same, therefore, it is impossible to distinguish the pros and cons of the computer device 2 and the target terminal 4 through GPU capability. At this time, the computer device 2 needs to further rely on other capability information for comparison, such as operating system version information, device model information, and so on.

Exemplarily, when the GPU capability of the computer device 2 is the same as the GPU capability of the target terminal 4, the computer device 2 may further rely on the storage capability information comparison to determine the rendering operation performer. Details are as follows:

In the exemplary embodiment, in order to more effectively select the device with better capability and more suitable for special effect rendering, comparing the first capability information with the second capability information and determining the rendering operation performer according to the comparison result, further includes:

Step 708, if the first GPU capability and the second GPU capability are the same, comparing a first storage capability of the computer device with a second storage capability of the target terminal according to the first storage capability information and the second storage capability information.

Step 710, if the first storage capability and the second storage capability are different, determining the rendering operation performer according to the comparison result between the first storage capability and the second storage capability.

According to the manufacturer, size, and available space of ROM and RAM in the computer device 2 and the manufacturer, size, and available space of the ROM and RAM in the target terminal 4, the computer device 2 can compare and determine whether the ROM and RAM capability of the computer device 2 is better than the ROM and RAM capability of the target terminal 4.

As the example, if the ROM and RAM capability of the computer device 2 is better than the ROM and RAM capability of the target terminal 4, it can be determined that the computer device 2 is the rendering operation performer.

The computer device 2 can jointly evaluate the ROM and RAM capability of the computer device 2 and the ROM and RAM capability of the target terminal 4 according to preset rules or running test programs, and determine whether the ROM and RAM capability of the computer device 2 is better than the ROM and RAM capability of the target terminal 4 according to the evaluation result.

As the example, if an evaluation score of ROM and RAM capability of the computer device 2 and the ROM and RAM capability of the target terminal 4 are the same, it is impossible to distinguish the pros and cons between the ROM and RAM of the computer device 2 and the ROM and RAM of the target terminal 4. At this time, the computer device 2 needs to further rely on other capability information for comparison, for example, sound card capability information, graphics card capability information, device model information, operating system version information, and so on.

For example, if the evaluation score of ROM and RAM capability of the computer device 2 and the ROM and RAM capability of the target terminal 4 are the same, the computer device 2 further relies on other capability information for comparison, such as sound card capability information. Details are as follows:

In the exemplary embodiment, in order to more effectively select the device with better capability and more suitable for special effect rendering, comparing the first capability information with the second capability information and determining the rendering operation performer according to the comparison result, further includes:

Step 712, if the first storage capability and the second storage capability are the same, comparing a first codec capability of the computer device with a second codec capability of the target terminal according to the first codec capability information and the second codec capability information.

Step 714, if the first codec capability and the second codec capability are different, determining the rendering operation performer according to the comparison result between the first codec capability and the second codec capability.

Whether it supports hardware codec, supported codec types (such as H264, H265), API version of the system interface and so on can be used to evaluate the capability score of the codec capability of the computer device 2 and the capability score of the codec capability of the target terminal 4. Based on the capability score of the codec capability of the computer device 2 and the capability score of the codec capability of the target terminal 4, the computer device 2 can determine whether the codec capability of the computer device 2 is better than the codec capability of the target terminal 4. As the example, if the codec capability of the computer device 2 is better than the codec capability of the target terminal 4, it may be determined that the computer device 2 is the rendering operation performer.

As the example, if capability score of codec capability of the computer device 2 is the same as the capability score of codec capability of the target terminal 4, it is impossible to distinguish the pros and cons of the computer device 2 and the target terminal 4 through the codec capability. At this time, the computer device 2 needs to further rely on other capability information for comparison, such as device model and so on. Details are as follows:

In the exemplary embodiment, in order to more effectively select the device with better capability and more suitable for special effect rendering, comparing the first capability information with the second capability information and determining the rendering operation performer according to the comparison result, further includes:

Step 716, if the first codec capability and the second codec capability are the same, obtaining a first device model score of the computer device and a second device model score of the target terminal according to the first device model information and the second device model information, and comparing the first device model score and the second device model score.

Step 718, if the first device model score and the second device model score are different, determining the rendering operation performer according to the comparison result between the first device model score and the second device model score.

According to the manufacturer and model of the computer device 2 and the manufacturer and model of the target terminal 4, the computer device 2 can compare whether the computer device 2 is better than the target terminal 4. The computer device 2 may jointly evaluate the computer device 2 and the target terminal 4 according to preset rules or running test programs, and determine whether the computer device 2 is better than the target terminal 4 according to the evaluation result.

As the example, if the computer device 2 is better than the target terminal 4, it can be determined that the computer device 2 is the rendering operation performer.

As the example, if the manufacturer, model, etc. of the computer device 2 are the same as the manufacturer, model, etc. of the target terminal 4, therefore, it is impossible to distinguish the pros and cons of the computer device 2 and the target terminal 4 through the manufacturer, model, etc. At this time, the computer device 2 needs to further rely on other capability information for comparison, such as operating system information. Details are as follows:

In the exemplary embodiment, in order to mom effectively select the device with better capability and more suitable for special effect rendering, comparing the first capability information with the second capability information and determining the rendering operation performer according to the comparison result, further includes:

Step 720, if the first device model score and the second device model score are the same, obtaining a first operating system score of the computer device and a second operating system score of the target terminal according to the first operating system information and the second operating system information, and comparing the first operating system score and the second operating system score.

Step 722, if the first operating system score and the second operating system score are different, determining the rendering operation performer according to the comparison result between the first operating system score and the second operating system score.

The computer device 2 can compare the operating system type, operating system version, etc. of the computer device 2 with the operating system type, operating system version, etc. of the target terminal 4 to determine the rendering operation performer. It should be noted that the comparison between the first operating system information and the second operating system information is performed based on the comparison result of the CPU capability and the comparison result of the storage capability, because combining the hardware comparison results and the test program scores, other parameters such as the real-time performance and fluency of the software system can be obtained.

In the exemplary embodiment, if the operating system of the computer device 2 and the operating system of the target terminal 4 have the same evaluation score, it is impossible to distinguish the pros and cons between the operating system of the computer device 2 and the operating system of the target terminal 4. At this time, the computer device 2 needs to further rely on other capability information for comparison. For example, sound card capability information, graphics card capability information, graphics rendering interface information, and so on. Details are as follows:

In the exemplary embodiment, in order to more effectively select the device with better capability and more suitable for special effect rendering, comparing the first capability information with the second capability information and determining the rendering operation performer according to the comparison result, further includes:

Step 724, if the first operating system score and the second operating system score are the same, comparing a first sound card capability of the computer device with a second sound card capability of the target terminal according to the first sound card capability information and the second sound card capability information.

Step 726, if the first sound card capability and the second sound card capability are different, determining the rendering operation performer according to the comparison result between the first sound card capability and the second sound card capability.

According to the manufacturer, model, performance, etc. of the sound card in the computer device 2 and the manufacturer, model, performance, etc. of the sound card in the target terminal 4, the computer device 2 can compare and determine whether the sound card capability of the computer device 2 is better than the sound card capability of the target terminal 4.

As the example, if the sound card capability of the computer device 2 is better than the sound card capability of the target terminal 4, it can be determined that the computer device 2 is the rendering operation performer. Exemplarily, the computer device 2 may jointly evaluate the sound card capability of the computer device 2 and the sound card capability of the target terminal 4 according to preset rules or running test programs, and determine whether the sound card capability of the computer device 2 is better than the sound card capability of the target terminal 4 according to the evaluation result.

As the example, if the evaluation scores of the sound card capability in the computer device 2 and the sound card capability in the target terminal 4 are the same, it is impossible to distinguish the pros and cons between the sound card capability of the computer device 2 and the sound card capability of the target terminal 4. At this time, the computer device 2 needs to further rely on other capability information for comparison. For example, graphics card capability information, graphics rendering interface information, and so on. Details are as follows:

In the exemplary embodiment, in order to more effectively select the device with better capability and more suitable for special effect rendering, comparing the first capability information with the second capability information and determining the rendering operation performer according to the comparison result, further includes:

Step 728, if the first sound card capability and the second sound card capability are the same, comparing a first graphics card capability of the computer device with a second graphics card capability of the target terminal according to the first graphics card capability information and the second graphics card capability information.

Step 730, if the first graphics card capability and the second graphics card capability are different, determining the rendering operation performer according to the comparison result between the first graphics card capability and the second graphics card capability.

According to the manufacturer, model, performance, etc. of the graphics card in the computer device 2 and the manufacturer, model, performance, etc. of the graphics card in the target terminal 4, the computer device 2 can compare and determine whether the graphics card capability of the computer device 2 is better than the graphics card of the target terminal 4.

As the example, if the graphics card capability of the computer device 2 is better than the graphics card capability of the target terminal 4, it can be determined that the computer device 2 is the rendering operation performer. Exemplarily, the computer device 2 may jointly evaluate the graphics card capability of the computer device 2 and the graphics card capability of the target terminal 4 according to preset rules or running test programs, and determine whether the graphics card capability of the computer device 2 is better than the graphics card capability of the target terminal 4 according to the evaluation result.

As the example, if the evaluation scores of the graphics card capability of the computer device 2 and the graphics card capability of the target terminal 4 are the same, it is impossible to distinguish the pros and cons between the graphics card capability of the computer device 2 and the graphics card capability of the target terminal 4. At this time, the computer device 2 needs to further rely on other capability information for comparison, for example, graphics rendering interface information and so on.

As the example, according to the graphics rendering interface type and version number of the graphics rendering interface in the computer device 2, the computer device 2 can obtain the evaluation score of the graphics rendering capability of the computer device 2; and, according to the graphics rendering interface type and version number of the graphics rendering interface in the target terminal 4, the computer device 2 can obtain the evaluation score of the graphics rendering capability of the target terminal 4.

If relying on comparison of other capabilities, whether the computer device 2 or the target terminal 4 is more suitable as the rendering operation performer of the multimedia content is still not distinguished, then the rendering operation performer is determined according to the default rule.

Step S306, if the computer device is the rendering operation performer, performing the rendering operation on the multimedia content.

The rendering operation may be the audio special effect rendering and the video special effect rendering.

If the computer device 2 is the rendering operation performer, the computer device 2 may have the following operation strategies:

The first operation strategy: performing the rendering operation on the multimedia content;

The second operation strategy: performing the rendering operation on the multimedia content until the computer device 2 is overloaded. In a situation where the computer device 2 is overloaded, the computer device 2 may further determine whether to perform part of the special effect rendering operation or not to perform the special effect rendering operation.

Step S308, sending the rendered multimedia content to the target terminal.

In the exemplary embodiment, if the multimedia content is audio content, the computer device 2 performs audio special effect rendering on the audio content according to the audio special effect data, and sends the audio content after the audio special effect rendering to the target terminal 4.

In the exemplary embodiment, if the multimedia content is video content, the computer device 2 performs video special effect rendering on the video content according to the video special effect data, and sends the video content after the video special effect rendering to the target terminal 4.

In the exemplary embodiment, if the multimedia content includes audio content and video content, the computer device 2 performs audio special effect rendering on the audio content of the multimedia content according to the audio special effect data, and performs video special effect rendering on the video content of the multimedia content according to the video special effect data, and the multimedia content after the special effect rendering is sent to the target terminal 4.

If the computer device 2 is not the rendering operation performer, the computer device 2 may execute the following exemplary subsequent operation procedures.

Figure 8:
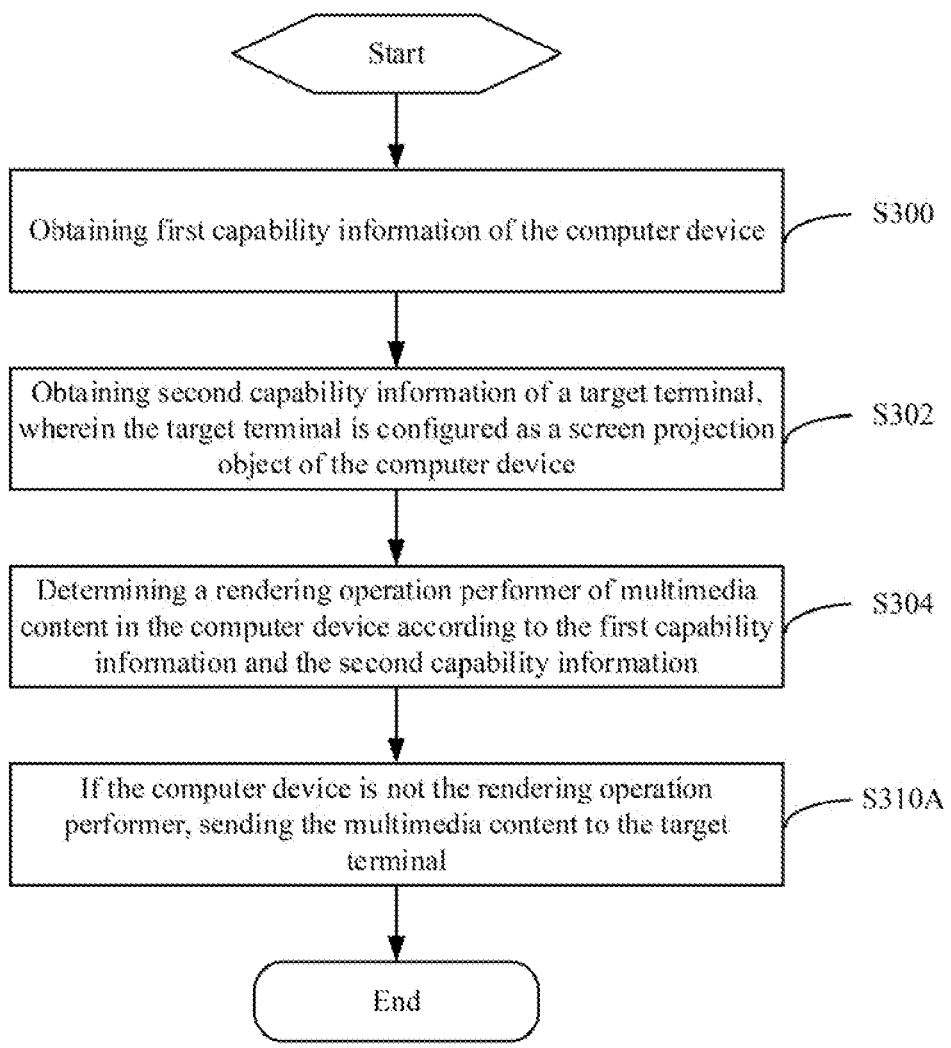
FIG. 8 schematically shows another flowchart of a screen projection method according to a first embodiment of the present application.

In the exemplary embodiment, as shown in FIG. 8, the screen projection method may further include step S310A, if the computer device 2 is not the rendering operation performer, sending the multimedia content to the target terminal. That is, when the target terminal 4 is determined to be the rendering operation performer, the computer device 2 does not perform the rendering operation on the multimedia content, and sends the un-rendered multimedia content to the target terminal 4, and the target terminal 4 performs the special effect rendering on the multimedia content.

Figure 9:
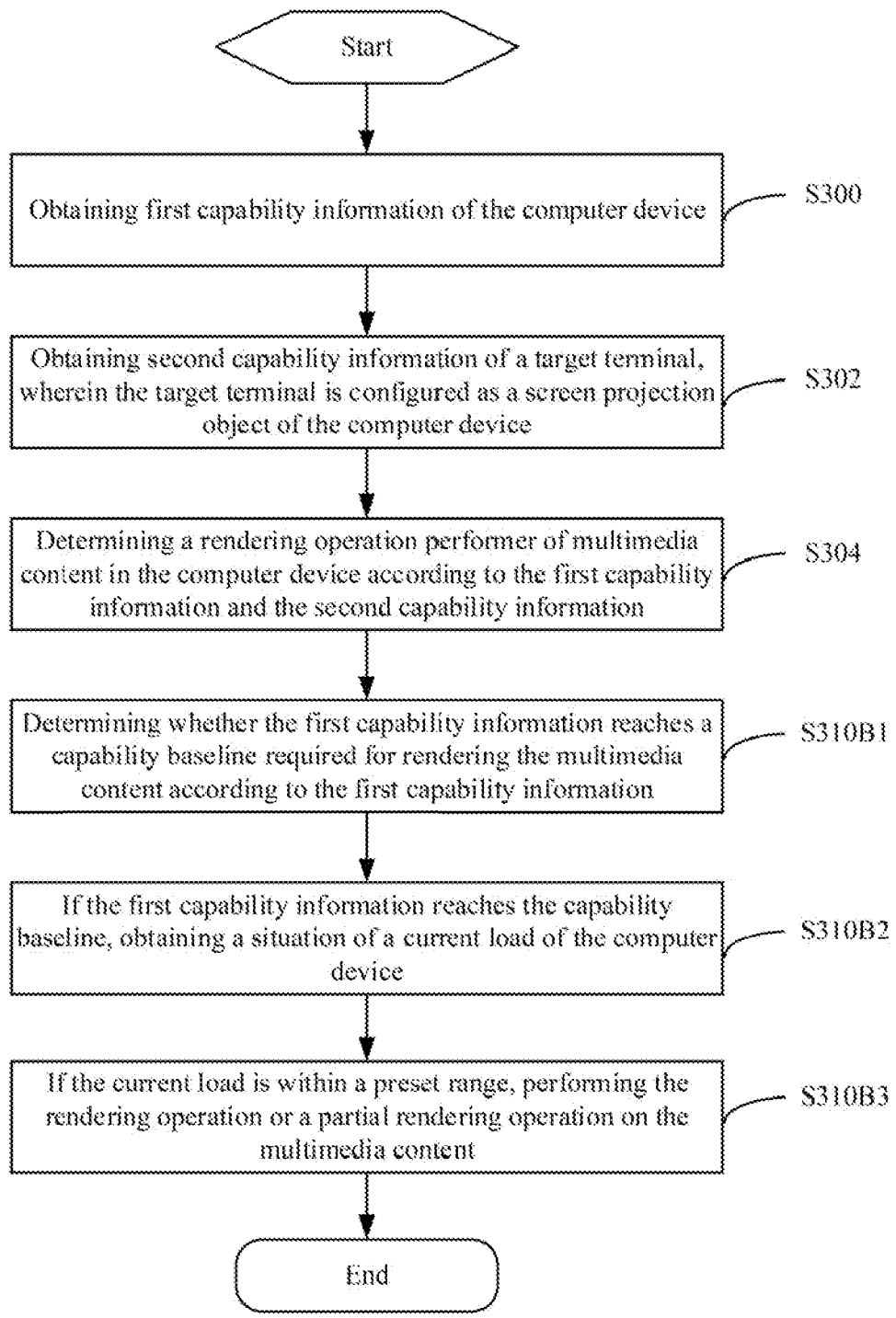
FIG. 9 schematically shows another flowchart of a screen projection method according to a first embodiment of the present application.

In the exemplary embodiment, as shown in FIG. 9, the screen projection method may further include steps S310B1 to S310B3. If the computer device is not the rendering operation performer, the following operations are performed: step S310B1, determining whether the first capability information reaches a capability baseline required for rendering the multimedia content according to the first capability information; step S310B2, if the first capability information reaches the capability baseline, obtaining a situation of a current load of the computer device; and step S310B3, if the current load is within a preset range, performing the rendering operation or a partial rendering operation on the multimedia content. If the current load is not within the preset range, the computer device 2 does not perform the rendering operation on the multimedia content, and directly sends the multimedia content to the target terminal 4, and the target terminal 4 performs the special effect rendering operation.

From the above steps S310B1 to S310B3, it can be known that on the premise that the target terminal 4 has been determined to be the rendering operation performer the computer device 2 can still dynamically determines at which side a certain frame of video data in the multimedia content is performed special effect rendering. The details are as follows: under the condition that the capability meets the capability baseline, the computer device 2 can dynamically decide to perform the special effect rendering on the certain frame of video data in the multimedia content according to the load situation. The target terminal 4 will detect whether the received certain frame of video data has completed the special effect rendering. If it is detected that the received certain frame of video data has completed the special effect rendering, the received certain frame of video data will be played directly; if it is detected that the received certain frame of video data has not undergone the special effect rendering, it will continue to determine whether the certain frame of video data requires the special effect rendering, if the certain frame of video data requires the special effect rendering, and the target terminal 4 performs the special effect rendering on the certain frame of video data, and displays the certain frame video data after the special effect rendering.

In order to facilitate understanding, the following a smartphone and a smart TV are provided as examples to provide a specific scenario.

Figure 10:
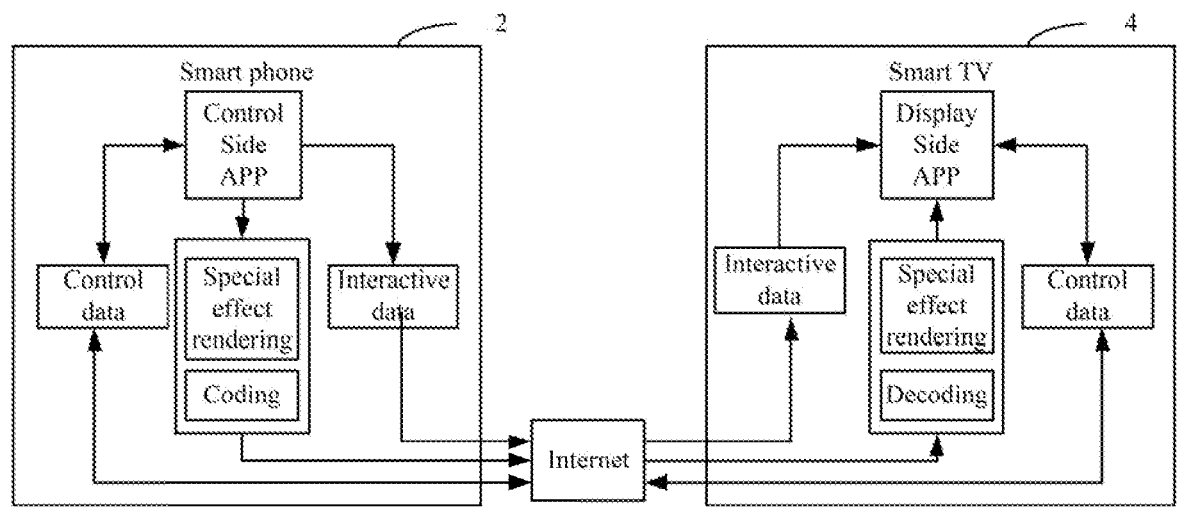
FIG. 10 schematically shows a data flow diagram of a screen projection method in a specific scenario according to a first embodiment of the present application.
Figure 1I:
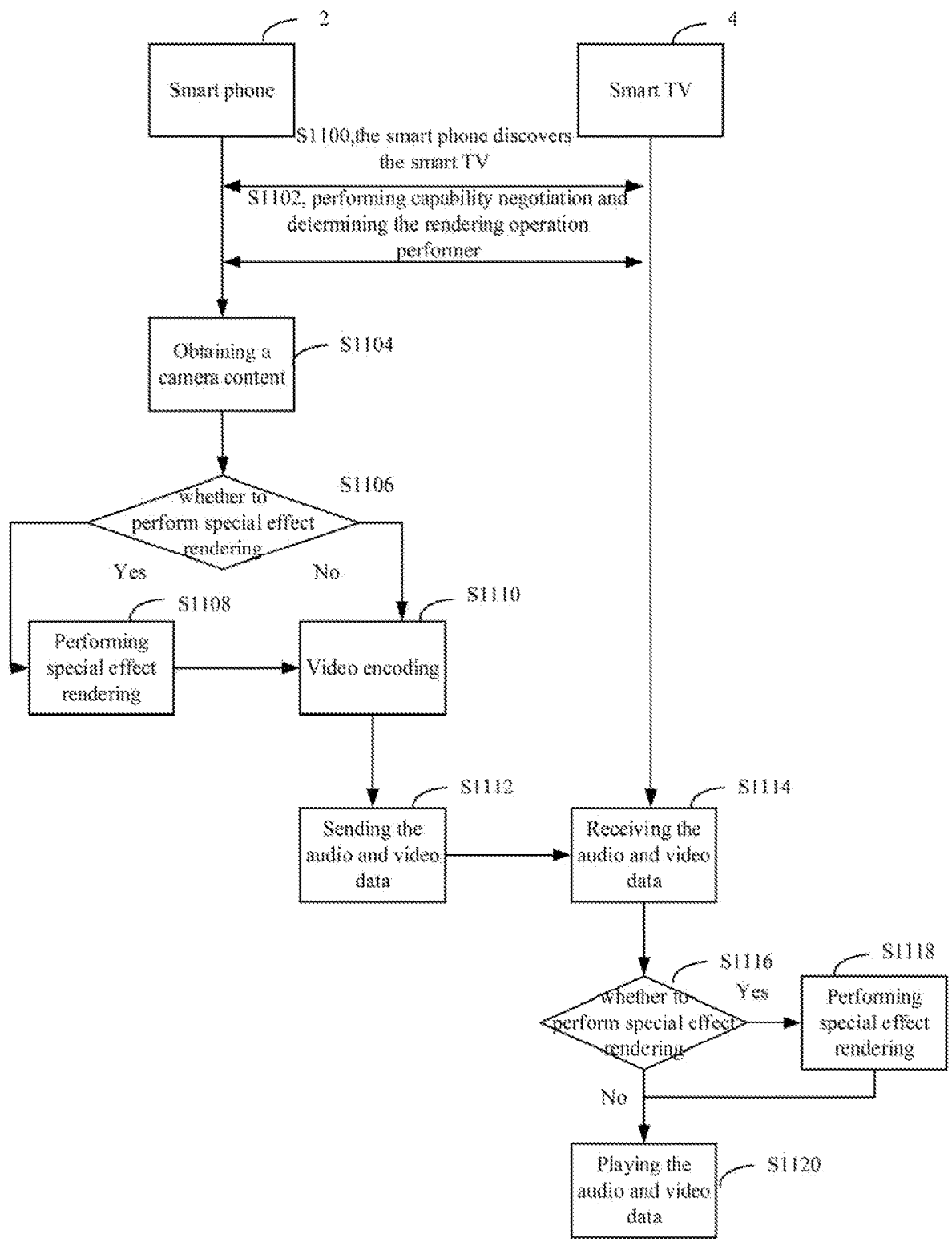

As shown in FIG. 10, in the specific scenario, a variety of data interactions can be performed between the smartphone 2 and the smart TV 4, such as multimedia content, control data, and interactive data. Wherein, the multimedia content needs to go through a codec, special effect rendering, and so on.

As shown in FIG. 11, FIG. 11 is a flowchart of the screen projection operation between the smartphone 2 and the smart TV 4.

In step S1100, the smartphone discovers the smart TV through the local area network or the Internet, and uses the smart TV as the screen projection object.

Step S1102, the smartphone detects its own first capability information and requests the smart TV to obtain the second capability information of the smart TV, and then determines the rendering operation performer according to the first capability information and the second capability information.

Step S1104, the smartphone obtains a camera content.

Step S1106, the smartphone determines whether to perform special effect rendering on the camera content. If yes, go to step S1108; otherwise, go to step S1110.

If in step S1102 the smart TV is determined to be the rendering operation performer:

The smartphone needs to determine whether its capability reaches the capability baseline to perform the special effect rendering on the camera content. If the capability baseline is not reached, step S1110 is entered. If the capability baseline is reached, the smartphone needs to further determine its current load state; if the smartphone is in an idle state, then a step S1108 is entered; otherwise, the step S1110 is entered. When the capability baseline is reached, the smartphone can dynamically decide whether to complete the special effect rendering by itself or the smart TV to complete the special effect rendering according to its current load state, if in step S1102 the smartphone is determined to be the rendering operation performer: The smartphone performs special effect rendering on the camera content. During the period, the smartphone needs to further determine its current load state; if the smartphone is not in a high load state, the step S1108 is entered; otherwise, the step S1110 is entered. In the other words, in the case that the smartphone negotiates as the rendering operation performer, the smartphone can also dynamically decide whether to complete the special effect rendering by itself or the smart TV to complete the special effect rendering according to its current load state.

In the case where the rendering operation performer has been determined, the specific special effect rendering operation performer can still be dynamically adjusted under some special circumstances. Which are special circumstances can be determined in advance, is no longer repeated here.

In step S1108, the smartphone performs special effect rendering on the camera content to obtain a video frame after the special effect rendering. The step S1110 is entered.

In step S1110, the smartphone performs a video encoding operation on the video frame after the special effect rendering obtained in step S1108, or performs the video encoding operation on the camera content (which is camera raw data) obtained in step S1104.

In step S1112, the smartphone sends the audio and video data obtained through step S1110 to the target TV.

In step S1114, the smart TV receives audio and video data sent by the smartphone.

In step S1116, the smart TV determines whether it is necessary to perform special effect rendering on the received audio and video data. The smart TV needs to determine whether the received audio and video data have completed special effect rendering. If the special effect rendering has been completed, the smart TV does not need to perform special effect rendering on the received audio and video data. If the special effect rendering is not completed, the smart TV needs to further determine whether the received audio and video data require special effect rendering. If the received audio and video data require special effect rendering, go to step S1118; otherwise, go to step S1120.

In step S1118, the smart TV performs special effect rendering on the received audio and video data.

In step S1120, the smart TV plays the audio and video data obtained through step S1116 or the audio and video data obtained through step S1118.

From the above content, it can be seen that the screen projection operation can serve the demonstration of smartphone special effect functions and the display of new special effect functions in large venues, on-site interaction and ordinary user's shooting interactive special effect scenes at home, for example, sports and fitness special effect based on user bone recognition.

It should be noted that the present application can also meet various application requirements, such as: a) On-site large-screen display requirements of special effect function conferences; b) Multi-viewer interaction requirements of special effect function combining large screen; c) Requirements for content intake and effect display of whole-body special effect.

For special effect demonstrators, the present application can have the following benefits: a) no longer need to demonstrate through small screen devices; b) real-time screen projection of effects can be synchronized to large screen devices; c) effects can be displayed to users of a larger area.

For ordinary users, the present application can have the following benefits: some special effects that may not have been perfectly experienced in smartphones may be able to use the rendering capability of large-screen devices to deliver special effects to the large-screen devices for rendering, making the experience the best.

A Second Embodiment

Figure 12:
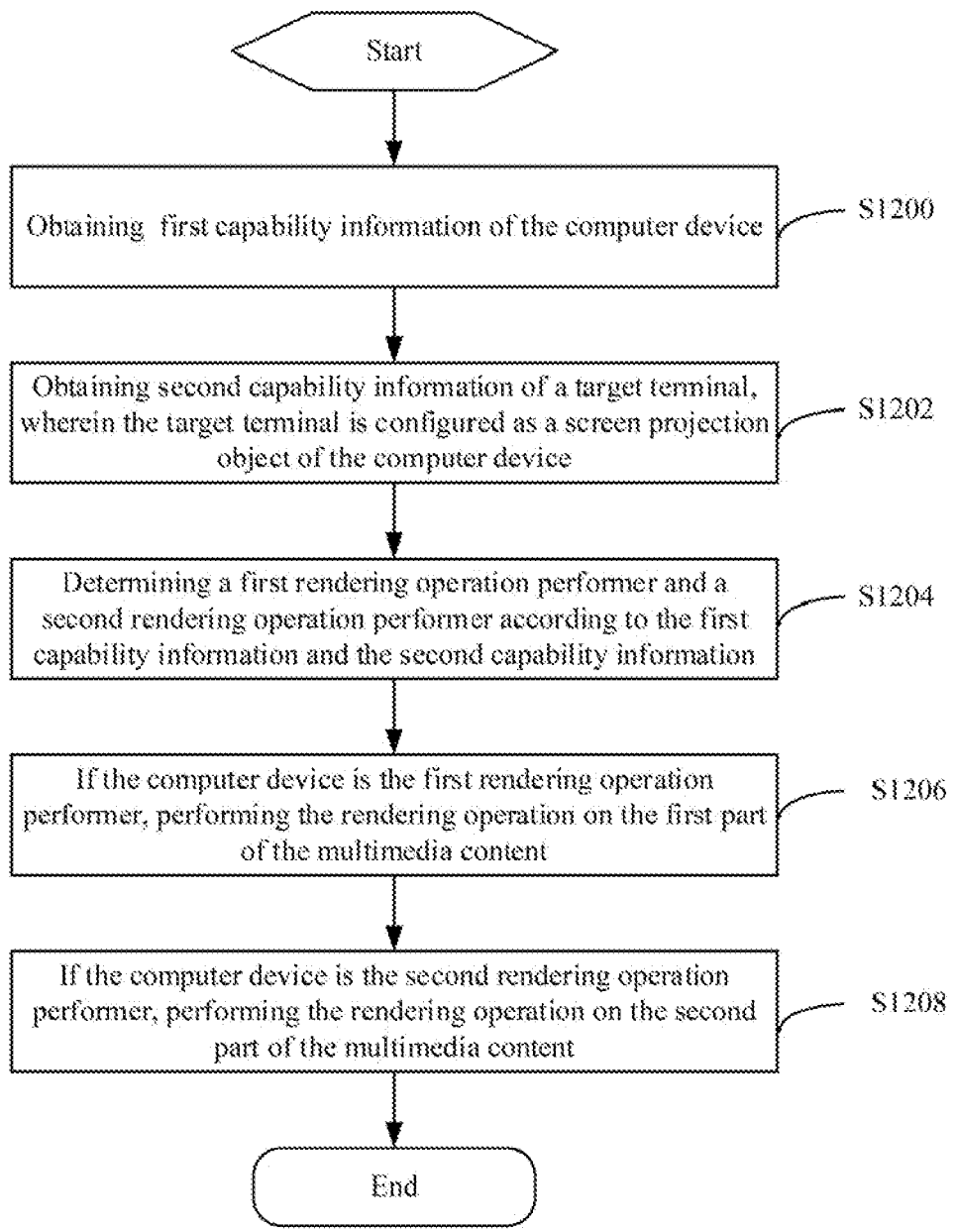
FIG. 12 schematically shows a flowchart of a screen projection method according to a second embodiment of the present application.

FIG. 12 schematically shows a flowchart of a screen projection method according to a second embodiment of the present application. It can be understood that the flowchart in the method embodiment is not used to limit the order of execution of the steps. The following exemplarily describes a computer device 2 as the execution subject.

As shown in FIG. 12, the screen projection method may include steps S1200 to S1208, wherein:

Step S1200, obtaining first capability information of the computer device.

Step S1202, obtaining second capability information of a target terminal, wherein the target terminal is configured as a screen projection object of the computer device.

Step S1204, determining a first rendering operation performer and a second rendering operation performer according to the first capability information and the second capability information, wherein the first rendering operation performer is for performing a rendering operation on a first part of multimedia content, and the second rendering operation performer is for performing the rendering operation on a second part of the multimedia content.

Step S1206, if the computer device is the first rendering operation performer, performing the rendering operation on the first part of the multimedia content.

Step S1208, if the computer device is the second rendering operation performer, performing the rendering operation on the second part of the multimedia content.

In the exemplary embodiment, the rendering operation includes an audio special effect rendering operation and a video special effect rendering operation.

Figure 13:
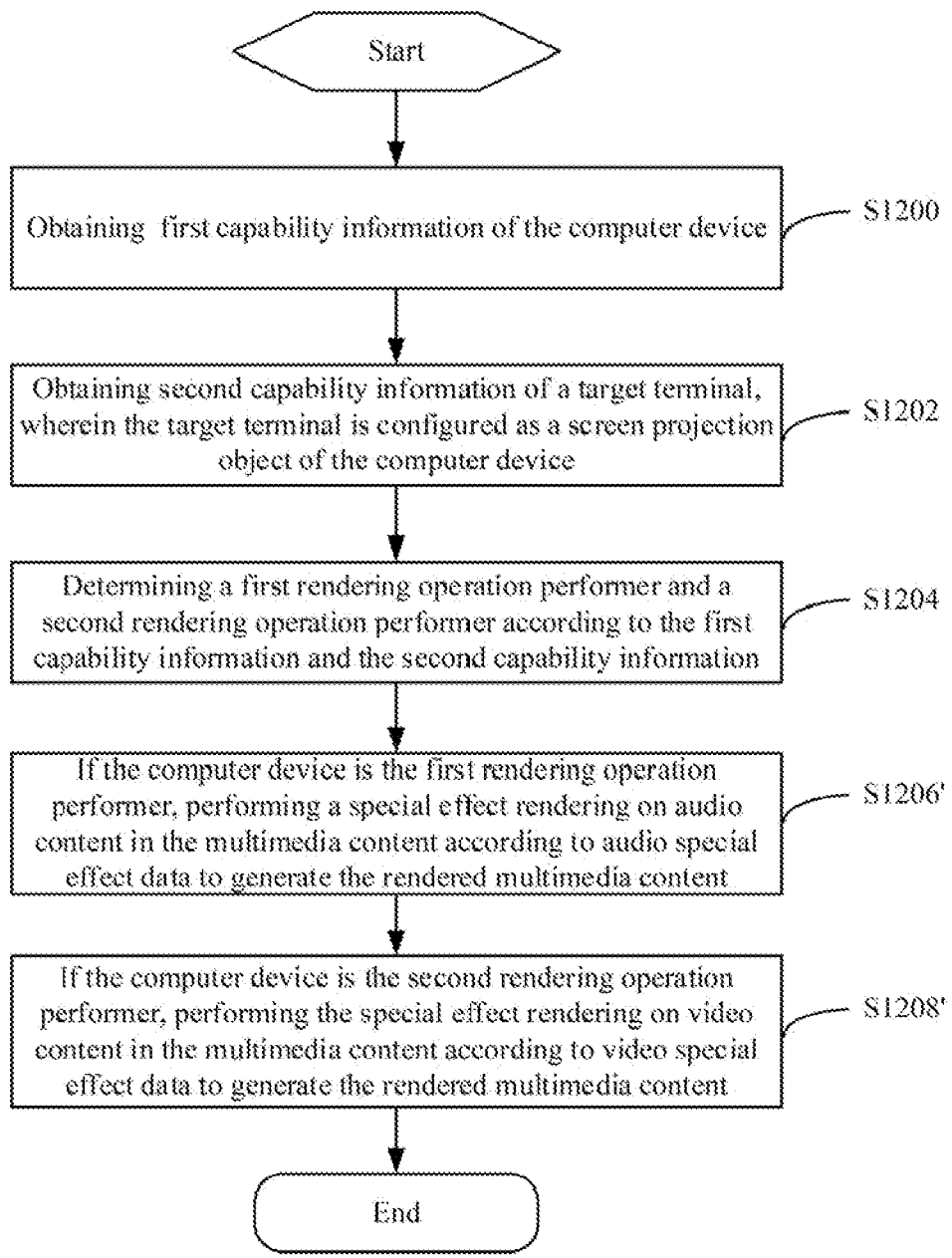
FIG. 13 schematically shows another flowchart of a screen projection method according to a second embodiment of the present application.

In the exemplary embodiment, as shown in FIG. 13, the step S1206 may include step S1206', performing a special effect rendering on audio content in the multimedia content according to audio special effect data to generate the rendered multimedia content. The audio special effect data may be data in the computer device, data provided by the target terminal 4, or data obtained through the Internet.

In the exemplary embodiment, as shown in FIG. 13, the step S1208 may include step S1208', performing the special effect rendering on video content in the multimedia content according to video special effect data to generate the rendered multimedia content. The video special effect data may be data in the computer device, data provided by the target terminal 4, or data obtained through the Internet.

Figure 14:
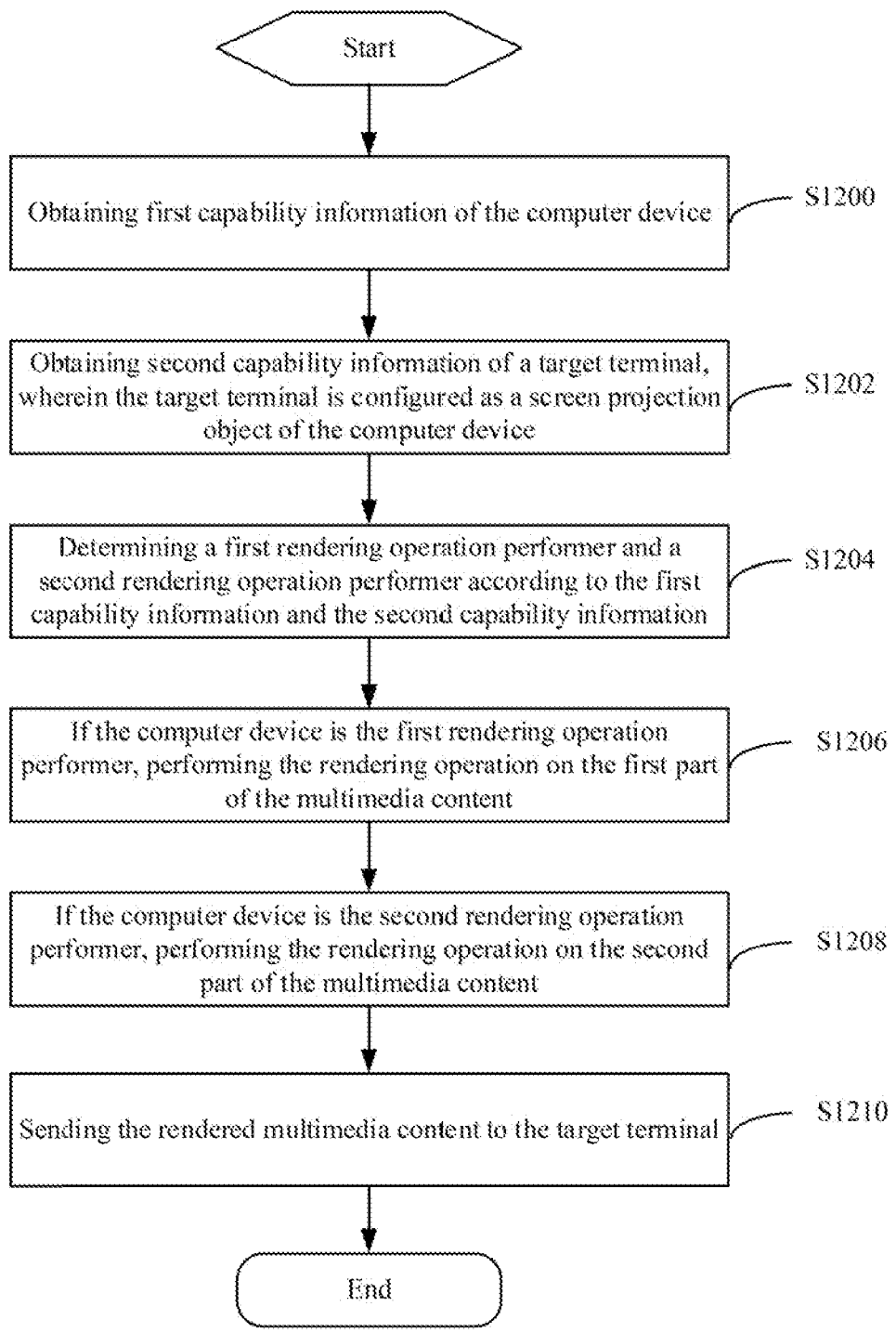
FIG. 14 schematically shows another flowchart of a screen projection method according to a second embodiment of the present application.

In the exemplary embodiment, as shown in FIG. 14, the screen projection method may further include step S1210: sending the rendered multimedia content to the target terminal, so that the target terminal acts as the second rendering operation performer or the first rendering operation performer to perform the rendering operation on the rendered multimedia content.

Figure 15:
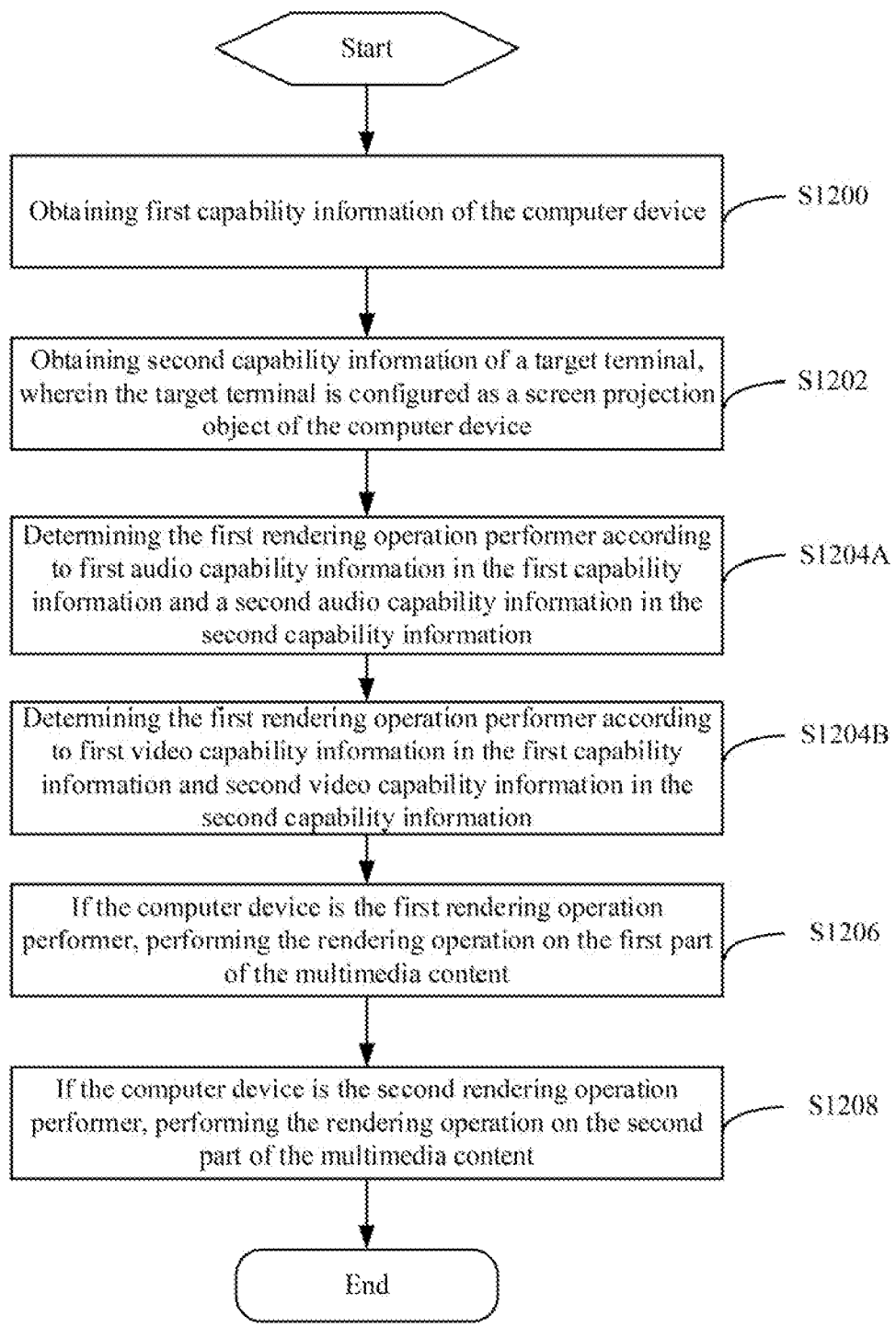
FIG. 15 schematically shows another flowchart of a screen projection method according to a second embodiment of the present application.

In the exemplary embodiment, as shown in FIG. 15, the determining the first rendering operation performer and the second rendering operation performer according to the first capability information and the second capability information, includes: determining the first rendering operation performer according to first audio capability information in the first capability information and second audio capability information in the second capability information.

The first audio capability information includes one or more of the following information: a first CPU capability information, a first storage capability information, a first device model information, first operating system information, and first codec capability information; and the second audio capability information includes one or more of the following information: second CPU capability information, second storage capability information, second device model information, second operating system information, and second codec capability information.

In the exemplary embodiment, as shown in FIG. 15, the determining the first rendering operation performer and the second rendering operation performer according to the first capability information and the second capability information, includes: determining the first rendering operation performer according to a first video capability information in the first capability information and a second video capability information in the second capability information.

The first video capability information includes one or more of the following information: the first CPU capability information, the first GPU capability information, the first storage capability information, the first graphics rendering interface information, the first device model information, the first operating system information, and the first codec capability information; and the second video capability information includes one or more of the following information: the second CPU capability information, the second GPU capability information, the second storage capability information, the second graphics rendering interface information, the second device model information, the second operating system information, and the second codec capability information.

The screen projection method of the second embodiment of the present application can determine which part of the content performs the special effect rendering operation on the screen projection performer and which part of the content performs the special effect rendering operation on the screen projection object according to the capabilities of the computer device (which is the screen projection performer) and the target terminal (which is the screen projection object), thereby making full use of the advantages of the screen projection performer and advantages of the screen projection object, maximizing the performance of the screen projection performer and the screen projection object, improving operating efficiency, and obtaining the best special effect rendering effect, further improving the user's viewing experience.

A Third Embodiment

Figure 16:
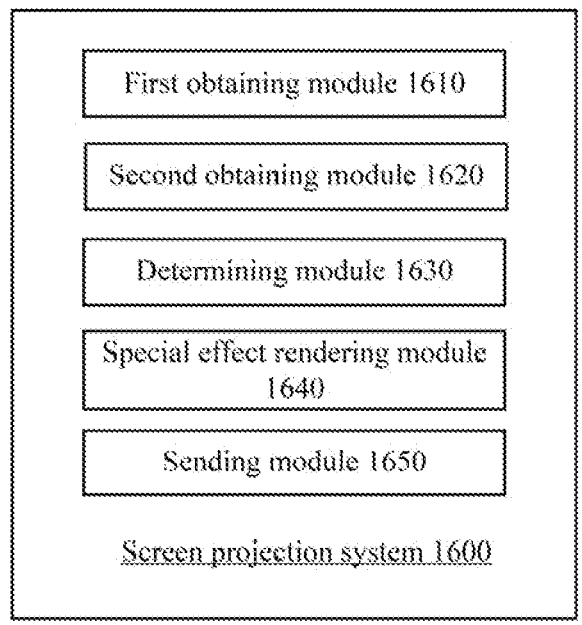
FIG. 16 schematically shows a block diagram of a screen projection system according to a third embodiment of the present application.

FIG. 16 schematically shows a block diagram of a screen projection system according to a third embodiment of the present application, and the screen projection system may be divided into one or more program modules, and the one or more program modules are stored in a storage medium and executed by one or more processors to complete the embodiment of the present application. The program modules referred to in the embodiment of the present application refers to a series of computer program instruction segments capable of completing specific functions. The following description will specifically introduce the function of each program module in the embodiment.

As shown in FIG. 16, the screen projection system 1600 may include a first obtaining module 1610, a second obtaining module 1620, a determining module 1630, a special effect rendering module 1640, and a sending module 1650, wherein:

The first obtaining module 1610, is for obtaining first capability information of the computer device.

The second obtaining module 1620, is for obtaining second capability information of a target terminal, wherein the target terminal is configured as a screen projection object of the computer device.

The determining module 1630, is for determining a rendering operation performer of multimedia content in the computer device according to the first capability information and the second capability information;

The special effect rendering module 1640, is for if the computer device is the rendering operation performer, performing a rendering operation on the multimedia content.

The sending module 1650, is for sending the rendered multimedia content to the target terminal.

In an exemplary embodiment, the sending module 1650 is further for: if the computer device is not the rendering operation performer, sending the multimedia content to the target terminal.

In the exemplary embodiment, the special effect rendering module 1640, is further for: if the computer device is not the rendering operation performer, then performing the following operations: determining whether the first capability information reaches a capability baseline required for rendering the multimedia content according to the first capability information; if the first capability information reaches the capability baseline, obtaining a situation of a current load of the computer device; and if the current load is within a preset range, performing the rendering operation or a partial rendering operation on the multimedia content.

In the exemplary embodiment, the second obtaining module 1620, is further for: sending a capability request information to the target terminal to request the target terminal to return the second capability information; and receiving the second capability information returned by the target terminal.

In the exemplary embodiment, the determining module 1630, is further for: determining whether the first capability information and the second capability information are both successfully obtained; if the first capability information and the second capability information are both successfully obtained, determining whether the first capability information reaches the capability baseline required for rendering the multimedia content, and whether the second capability information reaches the capability baseline; if the first capability information reaches the capability baseline, and the second capability information reaches the capability baseline, determining the rendering operation performer according to the first capability information and the second capability information.

In the exemplary embodiment, the capability baseline is determined according to a rendering special effect corresponding to the multimedia content, wherein the rendering special effect includes an audio special effect and/or a video special effect.

In the exemplary embodiment, the first capability information includes N first sub-capability information, and the N first sub-capability information includes: first device model information, first CPU capability information, first GPU capability information, first storage capability information, first sound card capability information, first graphics card capability information, first operating system information, first graphics rendering interface information, and/or first codec capability information; and the second capability information includes N second sub-capability information, and the N second sub-capability information includes: second device model information, second CPU capability information, second GPU capability information, second storage capability information, second sound card capability information, second graphics card capability information, second operating system information, second graphics rendering interface information, and/or second codec capability information.

In the exemplary embodiment, the determining module 1630, is further for: comparing M first sub-capacity information and M second sub-capability information one by one to obtain M capability score Pi corresponding to M first sub-capacity information and M capability score Qi corresponding to M second sub-capacity information; wherein, Pi represents the capability score corresponding to the i-th first sub-capability information obtained by comparing the i-th first sub-capability information with the i-th second sub-capability information, and Qi represents the capability score corresponding to the i-th second sub-capability information obtained by comparing the i-th first sub-capability information with the i-th second sub-capability information, $1 \leq i \leq M$ and $1 \leq M \leq N$; obtaining a first comprehensive capability score $$\sum_{i=1}^{M} P_i * W_i$$

of the first capability information according to the M capability scores corresponding to the M first sub-capability information; obtaining a second comprehensive capability score $$\sum_{i=1}^{M} Q_i * W_i$$

if the second capability information according to the M capability scores corresponding to the M second sub-capability information; comparing the first comprehensive capability score $$\sum_{i=1}^{M} P_i * W_i$$

and the second comprehensive capability score $$\sum_{i=1}^{M} Q_i * W_i,$$

and determining the rendering operation performer according to a comparison result; wherein, $W_i$ represents a weight value of the i-th first sub-capability information and the i-th second sub-capability information.

In the exemplary embodiment, $W_i$ is a dynamic value, whose size is in a positive proportional relationship with a score difference between the capability score Pi corresponding to the i-th first sub-capability information and the capability score Qi corresponding to the i-th second sub-capability information.

In the exemplary embodiment, the determining module 1630, is further for: performing following comparison operations in order until a capability difference between the computer device and the target terminal is distinguished: comparing a first CPU capability of the computer device with a second CPU capability of the target terminal according to the first CPU capability information and the second CPU capability information; comparing a first GPU capability of the computer device with a second GPU capability of the target terminal according to the first GPU capability information and the second GPU capability information; comparing a first storage capability of the computer device with a second storage capability of the target terminal according to the first storage capability information and the second storage capability information; comparing a first codec capability of the computer device with a second codec capability of the target terminal according to the first codec capability information and the second codec capability information; obtaining a first device model score of the computer device and a second device model score of the target terminal according to the first device model information and the second device model information, and comparing the first device model score and the second device model score; obtaining a first operating system score of the computer device and a second operating system score of the target terminal according to the first operating system information and the second operating system information, and comparing the first operating system score and the second operating system score; comparing a first sound card capability of the computer device with a second sound card capability of the target terminal according to the first sound card capability information and the second sound card capability information; comparing a first graphics card capability of the computer device with a second graphics card capability of the target terminal according to the first graphics card capability information and the second graphics card capability information.

In the exemplary embodiment, the determining module 1630, is further for: if the first capability information reaches the capability baseline, and the second capability information does not reach the capability baseline, determining the computer device to be the rendering operation performer; if the first capability information does not reach the capability baseline, and the second capability information reaches the capability baseline, determining the target terminal to be the rendering operation performer; if the first capability information does not reach the capability baseline, and the second capability information does not reach the capability baseline, determining the rendering operation performer according to the first capability information and the second capability information.

In the exemplary embodiment, the rendering operation performer includes a first rendering operation performer and a second rendering operation performer; and the determining module 1630, is further for: determining the first rendering operation performer and the second rendering operation performer according to the first capability information and the second capability information, wherein the first rendering operation performer is for performing the rendering operation on a first part of the multimedia content, and the second rendering operation performer is for performing the rendering operation on a second part of the multimedia content.

In the exemplary embodiment, the special effect rendering module 1640, is further for: if the computer device is the first rendering operation performer, performing the rendering operation on the first part of the multimedia content; if the computer device is the second rendering operation performer, performing the rendering operation on the second part of the multimedia content.

In the exemplary embodiment, the special effect rendering module 1640, is further for: performing a special effect rendering on audio content in the multimedia content according to audio special effect data to generate the rendered multimedia content.

In the exemplary embodiment, the special effect rendering module 1640, is further for: performing a special effect rendering on video content in the multimedia content according to video special effect data to generate the rendered multimedia content.

In the exemplary embodiment, the sending module 1650, is further for: sending the rendered multimedia content to the target terminal, so that the target terminal acts as the second rendering operation performer or the first rendering operation performer to perform the rendering operation on the rendered multimedia content.

In the exemplary embodiment, the determining module 1630, is further for: determining the first rendering operation performer according to first audio capability information in the first capability information and second audio capability information in the second capability information.

In the exemplary embodiment, the first audio capability information comprises one or more of the following information: first CPU capability information, first storage capability information, first device model information, first operating system information, and first codec capability information; and the second audio capability information comprises one or more of the following information: second CPU capability information, second storage capability information, second device model information, second operating system information, and second codec capability information.

In the exemplary embodiment, the determining module 1630, is further for: determining the first rendering operation performer according to a first video capability information in the first capability information and a second video capability information in the second capability information.

In the exemplary embodiment, the first video capability information comprises one or more of the following information: first CPU capability information, first GPU capability information, first storage capability information, first graphics rendering interface information, first device model information, first operating system information, and first codec capability information; and the second video capability information comprises one or more of the following information: second CPU capability information, second GPU capability information, second storage capability information, second graphics rendering interface information, second device model information, second operating system information, and second codec capability information.

A Fourth Embodiment

Figure 17:
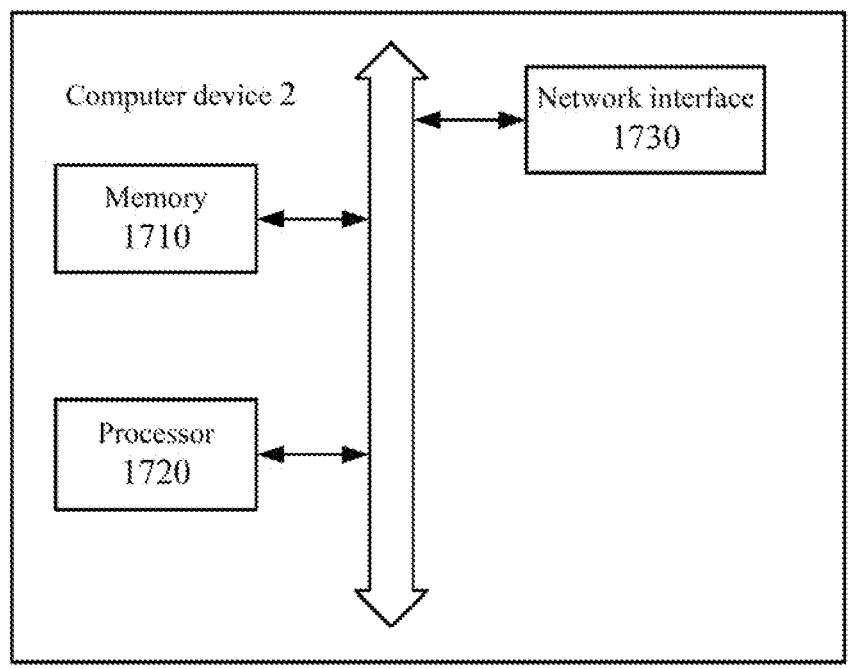
FIG. 17 schematically shows a schematic diagram of hardware architecture of a computer device according to a fourth embodiment of the present application.

FIG. 17 schematically shows a schematic diagram of hardware architecture of a computer device according to a fourth embodiment of the present application. In the embodiment, the computer device 2 is a device capable of automatically performing numerical calculations and/or information processing according to predefined or stored instructions, such as a smartphone, a tablet computer, a notebook computer, a desktop computer, and so on. As shown in FIG. 17, the computer device 2 includes, but is not limited to, a memory 1710, a processor 1720, and a network interface 1730 that can be communicated with each other through a system bus. Wherein:

The memory 1710 includes at least one type of computer-readable storage medium. The readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical dis and so on. In some embodiments, the memory 1710 may be an internal storage module of the computer device 2 such as a hard disk or memory of the computer device 2. In other embodiments, the memory 1710 may also be an external storage device of the computer device 2, such as a plugged hard disk provided in the computer device 2, a smart media card (SMC), secure digital (SD) card, a flash memory card, and so on. Of course, the memory 1710 may also include both an internal storage module and an external storage device of the computer device 2. In the embodiment, the memory 1710 is generally used to store an operating system and various types of application software installed in the computer device 2 such as program codes of the network communication method and the like. In addition, the memory 1710 may also be used to temporarily store various types of data that have been or will be outputted.

The processor 1720, in some embodiments, may be a central processing unit (CPU), a controller, a microprocessor, or other data processing chip. The processor 1720 is generally used to control the overall operation of the computer device 2 such as performing control and processing related to data interaction or communication with the computer device 2. In the embodiment, the processor 1720 is used to run program code stored in the memory 1710 or process data.

The network interface 1730 may include a wireless network interface or a wired network interface which is generally used to establish a communication connection between the computer device 2 and other computer devices. For example, the network interface 1730 is used for connecting the computer device 2 to an external terminal via a network and establishing a data transmission channel and a communication connection between the computer device 2 and the external terminal. The network can be a wireless or wired network such as an enterprise intranet, an Internet, a Global System of Mobile communication (GSM), a Wideband Code Division Multiple Access (WCDMA), a 4G network, a 5G network, a Bluetooth, Wi-Fi, and so on.

It is to be noted that FIG. 17 shows only the computer device 2 having components 1710-1730, but it is understood that it is not required to implement all of the shown components and that more or fewer parts can be implemented in lieu thereof.

In the embodiment, a screen projection method stored in the memory 1710 may be divided into one or more program modules and executed by one or more processors (processor 1720 in the embodiment) to complete the embodiment of the present application.

A Fifth Embodiment

The present application further provides a computer-readable storage medium, which stores computer programs, and when the computer programs are executed by a processor to realize the steps of a screen projection method in the embodiment.

In the embodiment, the computer-readable storage medium includes flash memory, hard disk, multimedia card, card type memory (such as SD or DX memory, etc.), random access memory (RAM), static random access memory (SRAM), read-only memory (ROM), electrically erasable programmable read-only memory (EEPROM), programmable read-only memory (PROM), magnetic memory, magnetic disk, optical disk and so on. In some embodiments, the computer-readable storage medium may be an internal storage module of the computing device such as a hard disk or memory of the computing device. In other embodiments, the memory may also be an external storage device of the computing device, such as a plugged hard disk provided in the computer device, a smart media card (SMC), secure digital (SD) card, a flash memory card, and so on. Of course, the computer-readable storage medium may also include both an internal storage module and an external storage device of the computing device. In the embodiment, the computer-readable storage medium is generally used to store an operating system and various types of application software installed in the computing device such as program codes of the network communication method and the like. In addition, the memory may also be used to temporarily store various types of data that have been or will be outputted.

Apparently, it should be appreciated by those skilled in the art that each module or step described in the embodiment of the present application can be realized by a general-purpose and that the modules or steps may be integrated on a single computer device or distributed on a network consisting of a plurality of computing devices, optionally, the modules or steps may be realized by executable program codes so that the modules or steps can be stored in a storage device to be executed by a computer device, and in some cases, the steps shown or described herein can be executed in a sequence different from this presented herein, or the modules or steps are formed into integrated circuit modules, or several of the modules or steps are formed into integrated circuit modules. Therefore, the embodiment of the present application is not limited to the combination of specific hardware and software. In addition, the "rendering" mentioned in the present application may be general rendering or special effect rendering. Since special effect rendering requires high computing resources, the present application is particularly suitable for special effect rendering. The screen projection system adopting the technical solution of the present application has extremely obvious advantages over the prior art.

The embodiments described above are just preferred embodiments of the present application and thus do not limit the patent scope of the present application. Any equivalent structure, or equivalent process transformation made according to the contents of the description and the drawings of the present application or any direct or indirect application to other related arts shall be also included in the patent protection scope of the present application.

What is claimed is:

1. A screen projection method, applied in a computer device, the method comprising:
   obtaining first information indicative of a capability of the computer device;
   obtaining second information indicative of a capability of a target terminal, wherein the target terminal is configured as a screen projection object of the computer device;
   determining a performer of performing rendering operations on multimedia content in the computer device based on the first information and the second information;
   in response to determining that the computer device is the performer, performing the rendering operations on the multimedia content by the computer device and sending rendered multimedia content to the target terminal; and
   in response to determining that the performer comprises the target terminal, performing operations comprising:
      determining whether the capability of the computer device reaches a capability baseline required for rendering the multimedia content based on the first information, wherein the capability baseline is dynamically changed based on rendering special effects of the multimedia content,
      in response to determining that the capability of the computer device reaches the capability baseline, obtaining information indicative of a current load of the computer device,
      determining that the current load of the computer device is within a predetermined range, and
      dynamically determining whether the computer device or the target terminal performs a special effect rendering on each video frame in the multimedia content so as to perform a partial rendering operation on the multimedia content.

2. The method of claim 1, further comprising:
   sending the multimedia content to the target terminal in response to determining that the performer comprises the target terminal.

3. The method of claim 1, wherein the obtaining second information indicative of a capability of a target terminal further comprises:
sending a request to the target terminal to request the target terminal to return the second information; and
receiving the second information from the target terminal.

4. The method of claim 1, further comprising:
determining that the second information is successfully obtained; and
determining whether the capability of the target terminal reaches the capability baseline based on the second information.

5. The method of claim 1, wherein the capability baseline is determined based on rendering the special effects corresponding to the multimedia content, and wherein the rendering special effects comprises rendering at least one of an audio special effect or a video special effect.

6. The method of claim 1,
wherein the first information comprises first sub-information indicative of N sub-capabilities of the computer device, and the first sub-information comprises first device model information, first Central Processing Unit (CPU) capability information, first Graphics Processing Unit (GPU) capability information, first storage capability information, first sound card capability information, first graphics card capability information, first operating system information, first graphics rendering interface information, and first codec capability information; and
wherein the second information comprises second sub-information indicative of N sub-capabilities of the target terminal, and the second sub-information comprises second device model information, second CPU capability information, second GPU capability information, second storage capability information, second sound card capability information, second graphics card capability information, second operating system information, second graphics rendering interface information, and second codec capability information.

7. The method of claim 6, wherein the determining a performer of performing rendering operations on multimedia content in the computer device based on the first information and the second information further comprises:
obtaining M capability scores $P_i$ corresponding to first sub-information indicative of M sub-capabilities of the computer device and obtaining M capability scores $Q_i$ corresponding to second sub-information indicative of M sub-capabilities of the target terminal, wherein $P_i$ represents a capability score corresponding to an i-th sub-capability of the computer device, and $Q_i$ represents a capability score corresponding to an i-th sub-capability of the target terminal, $1 \leq i \leq M$, and $1 \leq M \leq N$;
determining a first comprehensive capability score corresponding to the M sub-capabilities of the computer device based on a formula $$\sum_{i=1}^{M} P_i * W_i$$

and determining a second comprehensive capability score corresponding to the M sub-capabilities of the target terminal based on a formula $$\sum_{i=1}^{M} Q_i * W_i,$$

wherein $W_i$ represents a weight value and is determined based at least in part on comparing the capability score corresponding to the i-th sub-capability of the computer device and the capability score corresponding to the i-th sub-capability of the target terminal; and
determining the performer of performing rendering operations on the multimedia content based on comparing the first comprehensive capability score and the second comprehensive capability score.

8. The method of claim 7, wherein $W_i$ is a dynamic value, and $W_i$ is in a positive proportional relationship with a score difference between the capability score $P_i$ corresponding to the i-th sub-capability of the computer device and the capability score $Q_i$ corresponding to the i-th sub-capability of the target terminal.

9. The method of claim 6, wherein the determining a rendering operation performer of a multimedia content in the computer device based on the first information and the second information further comprises performing following comparison operations in order until a capability difference between the computer device and the target terminal is determined:
comparing a CPU capability of the computer device with a CPU capability of the target terminal based on the first CPU capability information and the second CPU capability information;
comparing a GPU capability of the computer device with a GPU capability of the target terminal based on the first GPU capability information and the second GPU capability information;
comparing a storage capability of the computer device with a storage capability of the target terminal based on the first storage capability information and the second storage capability information;
comparing a codec capability of the computer device with a codec capability of the target terminal based on the first codec capability information and the second codec capability information;
comparing a device model score of the computer device and a device model score of the target terminal based on the first device model information and the second device model information;
obtaining an operating system score of the computer device and an operating system score of the target terminal based on the first operating system information and the second operating system information;
comparing a sound card capability of the computer device with a sound card capability of the target terminal based on the first sound card capability information and the second sound card capability information; and
comparing a graphics card capability of the computer device with a graphics card capability of the target terminal based on the first graphics card capability information and the second graphics card capability information.

10. The method of claim 4, wherein the determining a rendering operation performer of a multimedia content in the computer device based on the first information and the second information further comprises:
when the capability of the computer device reaches the capability baseline and the capability of the capability of the target terminal does not reach the capability baseline, determining that the computer device is the performer of performing the rendering operations; and when the capability of the computer device does not reach the capability baseline and the capability of the target terminal reaches the capability baseline, determining that the target terminal is the performer of performing the rendering operations.

11. The method of claim 1, wherein the performer of performing the rendering operations comprises a first performer and a second performer, the first performer performs rendering operations on a first part of the multimedia content, and the second performer performs rendering operations on a second part of the multimedia content.

12. The method of claim 11, wherein the computer device is the first performer or the second performer.

13. The method of claim 12, further comprising:
performing a special effect rendering on audio content in the multimedia content based on audio special effect data to generate the rendered multimedia content.

14. The method of claim 12, further comprising:
performing a special effect rendering on video content in the multimedia content based on video special effect data to generate the rendered multimedia content.

15. The method of claim 12, further comprising:
sending multimedia content partially rendered by the computer device to the target terminal so that the target terminal acts as another performer to perform rendering operations on the other part of the multimedia content.

16. A system, comprising:
at least one processor, and
at least one memory communicatively coupled to the at least one processor and storing instructions that upon execution by the at least one processor cause the system at least to:
obtain first information indicative of a capability of the computer device;
obtain second information indicative of a capability of a target terminal, wherein the target terminal is configured as a screen projection object of the computer device;
determine a performer of performing rendering operations on multimedia content in the computer device based on the first information and the second information;
in response to determining that the computer device is the performer, perform the rendering operations on the multimedia content by the computer device and send rendered multimedia content to the target terminal; and
in response to determining that the performer comprises the target terminal, perform operations comprising:
determining whether the capability of the computer device reaches a capability baseline required for rendering the multimedia content based on the first information, wherein the capability baseline is dynamically changed based on rendering special effects of the multimedia content,
in response to determining that the capability of the computer device reaches the capability baseline, obtaining information indicative of a current load of the computer device,
determining that the current load of the computer device is within a predetermined range, and
dynamically determining whether the computer device or the target terminal performs a special effect rendering on each video frame in the multimedia content so as to perform a partial rendering operation on the multimedia content.

17. The system of claim 16, wherein the capability baseline is determined based on rendering the special effects corresponding to the multimedia content, and wherein the rendering special effects comprises rendering at least one of an audio special effect or a video special effect.

18. The system of claim 16,
wherein the first information comprises first sub-information indicative of N sub-capabilities of the computer device, and the first sub-information comprises first device model information, first CPU capability information, first GPU capability information, first storage capability information, first sound card capability information, first graphics card capability information, first operating system information, first graphics rendering interface information, and first codec capability information; and
wherein the second information comprises second sub-information indicative of N sub-capabilities of the target terminal, and the second sub-information comprises second device model information, second CPU capability information, second GPU capability information, second storage capability information, second sound card capability information, second graphics card capability information, second operating system information, second graphics rendering interface information, and second codec capability information.

19. The system of claim 18, wherein the at least one memory further stores instructions that upon execution by the at least one processor cause the system at least to:
obtain M capability scores $P_i$ corresponding to first sub-information indicative of M sub-capabilities of the computer device, and obtain M capability scores $Q_i$ corresponding to second sub-information indicative of M sub-capabilities of the target terminal, wherein $P_i$ represents a capability score corresponding to an i-th sub-capability of the computer device, and $Q_i$ represents a capability score corresponding to an i-th sub-capability of the target terminal, $1 \leq i \leq M$, and $1 \leq M \leq N$;
determine a first comprehensive capability score corresponding to the M sub-capabilities of the computer device based on a formula $$\sum_{i=1}^{M} P_i * W_i,$$

and determine a second comprehensive capability score corresponding to the M sub-capabilities of the target terminal based on a formula $$\sum_{i=1}^{M} Q_i * W_i,$$

wherein $W_i$ represents a weight value and is determined based at least in part on comparing the capability score corresponding to the i-th sub-capability of the computer device and the capability score corresponding to the i-th sub-capability of the target terminal; and
determine the performer of performing rendering operations on the multimedia content based on comparing the first comprehensive capability score and the second comprehensive capability score.

20. A non-transitory computer-readable storage medium, storing computer-readable instructions that upon execution by a processor cause the processor to implement a screen projection method, the method comprising:

obtaining first information indicative of a capability of the computer device;

obtaining second information indicative of a capability of a target terminal, wherein the target terminal is configured as a screen projection object of the computer device;

determining a performer of performing rendering operations on multimedia content in the computer device based on the first information and the second information;

in response to determining that the computer device is the performer, performing the rendering operations on the multimedia content by the computer device and sending rendered multimedia content to the target terminal; and in response to determining that the performer comprises the target terminal, performing operations comprising:

determining whether the capability of the computer device reaches a capability baseline required for rendering the multimedia content based on the first information, wherein the capability baseline is dynamically changed based on rendering special effects of the multimedia content, in response to determining that the capability of the computer device reaches the capability baseline, obtaining information indicative of a current load of the computer device, determining that the current load of the computer device is within a predetermined range, and dynamically determining whether the computer device or the target terminal performs a special effect rendering on each video frame in the multimedia content so as to perform a partial rendering operation on the multimedia content.

\* \* \* \* \*